US012349769B2

(12) United States Patent
Ahn et al.

(10) Patent No.: US 12,349,769 B2
(45) Date of Patent: Jul. 8, 2025

(54) SPRAYING SYSTEM FOR FOOTWEAR

(71) Applicant: NIKE, Inc., Beaverton, OR (US)

(72) Inventors: Hyun Tae Ahn, Jung-gu Seoul (KR); TaeSoo Ha, Busan (KR); Won Seok Kang, Busan (KR); Jae Eik Koo, Busan (KR); Sang Hee Lee, Busan (KR); Daeyoung Park, Gimhae-si (KR); John J. Park, Busan (KR); SungChul Park, Gimhae-si (KR)

(73) Assignee: NIKE, Inc., Beaverton, OR (US)

( * ) Notice: Subject to any disclaimer, the term of this patent is extended or adjusted under 35 U.S.C. 154(b) by 24 days.

(21) Appl. No.: 18/090,231

(22) Filed: Dec. 28, 2022

(65) Prior Publication Data

US 2023/0135310 A1 May 4, 2023

Related U.S. Application Data

(63) Continuation of application No. 17/141,941, filed on Jan. 5, 2021, now Pat. No. 11,559,111.
(Continued)

(51) Int. Cl.
*B05D 1/00* (2006.01)
*A43D 25/18* (2006.01)
(Continued)

(52) U.S. Cl.
CPC ........ *A43D 25/183* (2013.01); *A43D 111/003* (2013.01); *B05B 12/22* (2018.02); *B05B 12/28* (2018.02); *A43D 2200/10* (2013.01)

(58) Field of Classification Search
CPC ........................................................ B05D 1/00
See application file for complete search history.

(56) References Cited

U.S. PATENT DOCUMENTS 1,959,711 A 5/1934 Flint et al.
2,700,929 A 2/1955 Williams
(Continued)

FOREIGN PATENT DOCUMENTS

CN 107319693 A 11/2017
CN 107812632 A 3/2018
(Continued)

OTHER PUBLICATIONS

Extended European Search Report received for European Application No. 24197585.3, mailed on Dec. 4, 2024, 8 pages.

*Primary Examiner* — Gordon Baldwin
*Assistant Examiner* — Mohammad Mayy
(74) *Attorney, Agent, or Firm* — SHOOK, HARDY & BACON L.L.P.

(57) ABSTRACT

The manufacturing of footwear includes the joining of components. The joining may be accomplished with adhesive. The adhesive, such as a polyurethane, is applied as a single-sided adhesive to a footwear component. The application of the adhesive can contaminate the system that is applying the adhesive with intentional over spray of the footwear component. The over spray ensures adequate coverage of the footwear component to allow a sufficient bond. A masking platform of the system masks portions of the system to limit the contamination caused by the over spray. Additionally, material brushes and scrapers may engage with components of the system to remove or limit adhesive contamination on those components. A vision system maps a surface of the footwear component to ensure the adhesive is applied for the specific article.

18 Claims, 14 Drawing Sheets

Related U.S. Application Data

(60) Provisional application No. 62/957,662, filed on Jan. 6, 2020.

(51) Int. Cl.
*A43D 111/00* (2006.01)
*B05B 12/22* (2018.01)
*B05B 12/28* (2018.01)

(56) References Cited

U.S. PATENT DOCUMENTS 5,480,297 A * 1/1996 Ross .................... B29D 35/061 425/453
6,893,204 B1 5/2005 Suzuki et al.
9,283,583 B2 3/2016 Regan et al.
11,559,111 B2 1/2023 Ahn et al.
2014/0081441 A1 3/2014 Regan et al.
2014/0329013 A1 11/2014 Rouaud
2015/0107032 A1* 4/2015 Regan ..................... B24C 1/086 451/39
2015/0121632 A1 5/2015 Kuo
2015/0190830 A1* 7/2015 Regan ................. B05B 13/0221 118/696
2015/0282565 A1* 10/2015 Kilgore ................ B29D 35/126 427/389.9
2016/0136783 A1* 5/2016 Park ....................... A43B 13/04 451/39
2017/0150776 A1 6/2017 Montoya
2017/0202317 A1 7/2017 Makover et al.
2018/0129185 A1* 5/2018 Jurkovic ................ A43D 11/00
2018/0147590 A1* 5/2018 Chen ..................... B05C 5/0204
2019/0150571 A1 5/2019 Hsu et al.
2019/0150573 A1 5/2019 Hsu et al.
2019/0365054 A1 12/2019 Chang et al.
2021/0204656 A1 7/2021 Ahn et al.

FOREIGN PATENT DOCUMENTS

CN 108114821 A 6/2018
CN 110465424 A 11/2019
KR 10-1866292 B1 6/2018
KR 10-2058300 B1 1/2020
KR 10-2067911 B1 1/2020
TW 201724986 A 7/2017
WO 2018/102386 A1 6/2018

* cited by examiner

SPRAYING SYSTEM FOR FOOTWEAR

CROSS-REFERENCE TO RELATED APPLICATIONS

This application is a continuation of co-pending U.S. patent application Ser. No. 17/141,941, titled "Spraying System For Footwear" and filed on Jan. 5, 2021, which claims the benefit of priority to U.S. Provisional Application No. 62/957,662, titled "Spraying System for Footwear" and filed Jan. 6, 2020. The aforementioned is incorporated by reference herein.

TECHNICAL FIELD

Aspects hereof relate to a system and method for spraying an article of footwear component.

BACKGROUND

Footwear components, such as a shoe sole, often have a material applied through spraying during assembly and manufacturing. For example, it is common to spray an adhesive and/or primer on a footwear component during an assembly process. However, this spraying process is traditionally a laborious process that relies on trained labor having throughput limitations.

BRIEF SUMMARY

Aspects hereof provide systems and methods for applying a material to an article, such as an article of footwear component. The system automates the loading, scanning, spraying, and system cleaning operations for the application of the material to the article. The article is loaded on a cradle such that it is secured for conveyance and also application of the material, such as a polyurethane adhesive. The article is then scanned by a vision system to determine the surface geometry of the article in order to sufficiently apply the material thereon. The dimensional mapping of the surface ensure a tool path is used by an application module that over sprays the article in an intentional manner to ensure coverage of the material to extreme edges of the surface being sprayed. The over sprayed material is capable of contaminating the system. Therefore, the application module also includes a masking platform that at least partially surrounds the cradle to mask portions of the system from the intentional over spray. Components are incorporated in the system to manage the over sprayed material that is captured by the masking platform and the cradle to ensure the system is available for continuous use.

An example of a system capable of spraying an article of footwear component includes a cradle having a support surface, a first finger, and a second finger capable to compress the article of footwear component between the first finger and the second finger. The system also includes a vision system having a field of view directed to the cradle support surface, wherein the vision system is comprised of a laser and an image capture device. The system also includes an application station. The application station includes a spraying nozzle, a multi-axis conveyance mechanism, and a masking platform. The masking platform is moveable between a first position and a second position. The masking platform at least partially surrounds the cradle when the masking platform is in the second position and is retracted from the cradle in the first position.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
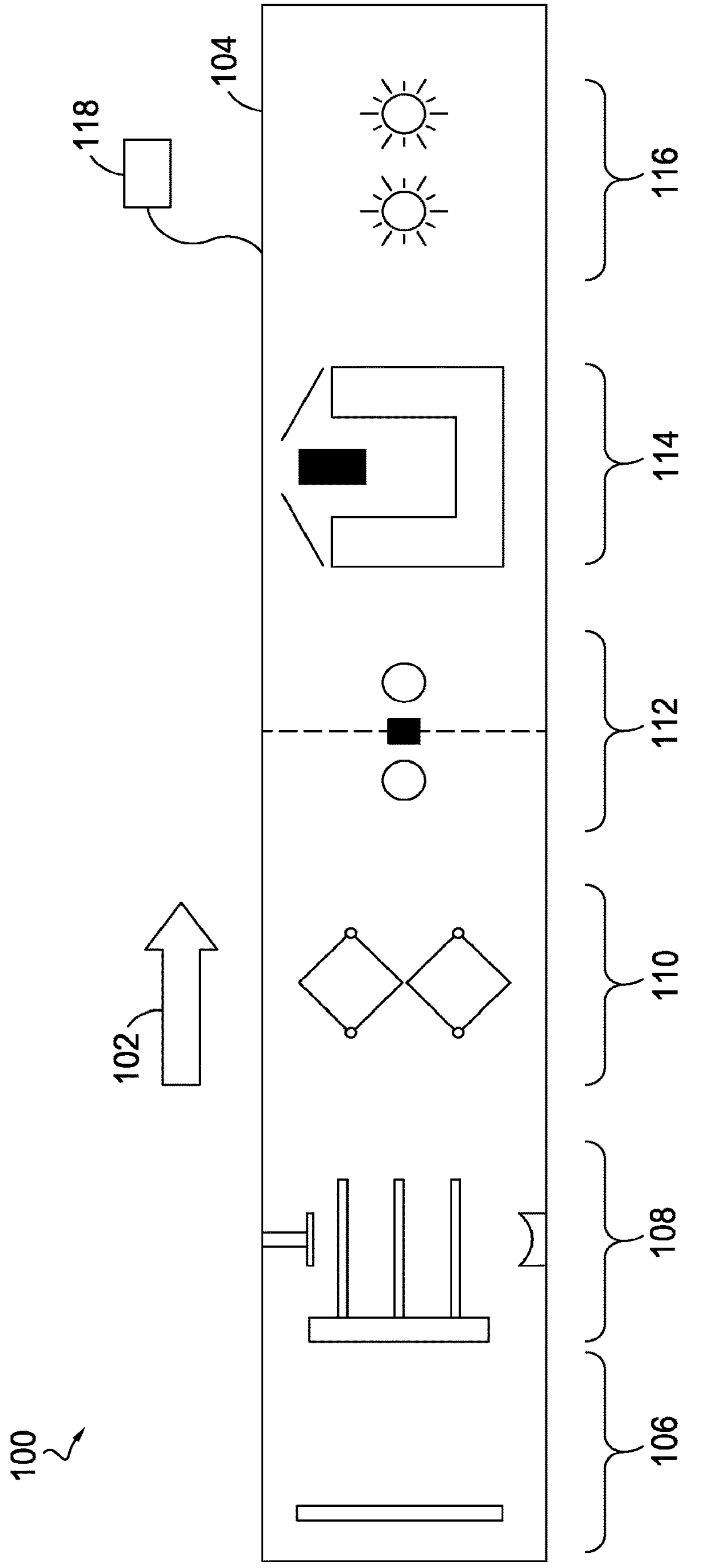
FIG. 1 depicts an example of a system capable of spraying an article of footwear component, in accordance with exemplary aspects hereof.

Aspects hereof provide apparatuses, systems and/or methods to spray a component for an article of footwear. Specifically, the system including apparatuses and performing methods contemplate securing a component, such as an article of footwear sole (hereinafter a "sole"), in a cradle between a series of fingers that compress the sole. The cradle then transports the sole within a field of view of a vision system. The vision system is effective to identify a surface mapping of the sole and or to identify a position of the sole relative to the cradle. After which, the sole is positioned at an application module that includes a spraying nozzle extending from a multi-axis conveyance mechanism, such as a multi-axis robotic arm. A masking platform may then be positioned around the sole, and by connection, at least a portion of the cradle to protect the cradle and the system from material over spray. The spraying nozzle may then proceed with applying a material, such as a hot-melt adhesive to the sole. Subsequent to applying the material, the masking platform repositions, which allows the cradle to continue through the system.

The systems, apparatus, and methods provided herein allow for a continuous output of sprayed components by positioning, conveying, masking, and spraying with continuous cleaning through system design, as will be discussed hereinafter.

A first aspect provides a system capable of spraying an article of footwear component. The system includes a cradle having a support surface, a first finger, and a second finger capable to compress the article of footwear component between the first finger and the second finger. The system also includes a vision system having a field of view directed to the cradle support surface, wherein the vision system is comprised of a laser and an image capture device. The system also includes an application station. The application station includes a spraying nozzle, a multi-axis conveyance mechanism, and a masking platform. The masking platform is moveable between a first position and a second position. The masking platform at least partially surrounds the cradle when the masking platform is in the second position and is retracted from the cradle in the first position.

Another aspect provides a method of spraying an article of footwear component. The method includes securing an article of footwear component between a first finger and a second finger on opposite sides of a cradle and then scanning the article of footwear component with a vision system having a field of view directed to the cradle. The vision system is comprised of a laser and an image capture device. The method also includes applying an adhesive to the article of footwear component at an application station. The application station includes a spraying nozzle from which the adhesive is applied to the article of footwear component, a multi-axis conveyance mechanism from which the spraying nozzle extends and is moved by the multi-axis conveyance mechanism, and a masking platform. The masking platform moves between a first position and a second position to mask at least a portion of the cradle from adhesive sprayed from the spraying nozzle.

As will be provided hereinafter, additional apparatuses performing additional steps to methods are contemplated to aid in the spraying of the article of footwear component. Those additional apparatus and/or steps are optional as provided herein.

Turning to the figures generally and to FIG. 1 specifically, which depicts an example of a system 100 capable of spraying an article of footwear component, in accordance with exemplary aspects hereof. The system 100 is illustrated in simplified terms to provide a general understanding of the apparatus, components, modules, and relative position thereof. Additional details of example apparatus, component, and modules will be provided in subsequent figures. However, it is intended that FIG. 1 is representative of a contemplated example and not a limitation.

The system 100 is comprised of a series of modules and apparatuses along a material flow direction 102. The material flow direction 102 is a general progression of an article of footwear component through the system 100. The material flow direction 102 is, sometimes, referenced for a specific ordering of modules and apparatuses that occur in a specific sequence. It is contemplated that the order of modules and apparatuses may be altered in other examples.

In the material flow direction 102, the system 100 is comprised of one or more conveyance mechanisms 104, a loading module 106, an alignment module 108, a cradle loading module 110, a vision system 112, an application module 114, and a cradle cleaning module 116. While the system 100 is depicted in a linear sequence, it is contemplated that the system 100 may alternatively be arranged in a non-linear manner (e.g., circular, loop, and the like). While specific modules and systems are identified in the system 100, it is understood that one or more may be omitted or added while still within the scope contemplated.

The loading module 106 will be discussed in greater detail in connection with FIGS. 2-4 hereinafter. The loading module 106, in part, regulates the entry of an article of footwear component, such as a sole, to the system 100. For example, it is contemplated that a human or mechanized process may batch a plurality of articles for entry into the system 100. The loading module 106 provides a regulating function to allow entry of the articles at defined times, such as a constant rate. The loading module, as will be discussed hereinafter, may be a blocker that impedes the flow of the articles in the material flow direction 102 until a single (or multiple) article(s) is released by the blocker.

The alignment module 108 provides an alignment function in one or more of the longitudinal direction (i.e., parallel with the material flow direction 102) and the transverse direction (i.e., perpendicular to the material flow direction 102) for an article being conveyed in the system 100. The alignment of the article allows for automated loading of the article in a cradle, as will be discussed herein. The alignment module will be discussed in connection with at least FIGS. 5-7. The alignment of the article by the alignment module 108 may leverage one or more actuation mechanisms (e.g., pneumatic actuator, hydraulic actuator, electric linear actuator) to position a body that influences a location of the article to an intended location.

The cradle loading module 110 is effective to transfer the article from the alignment module 108 to a cradle. The cradle loading module 110 will be discussed in greater detail in connection with at least FIGS. 8-11D. In an example, the cradle loading module 110 provides a transition from a first conveyance mechanism (e.g., conveyor belt mechanism) of the system 100 to a second conveyance mechanism (e.g., a cradle on a track) while intentionally positioning the article being transferred to the cradle in an intended position and orientation relative to the cradle for future processing of the article while being supported and maintained by the cradle.

The vision system 112 scans the article to determine an identity of the article and/or to determine a surface/shape of the article for a future spraying operation. The vision system 112 will be discussed in connection with at least FIG. 12 herein. The vision system is contemplated as comprising one or more image capture devices (e.g., camera) and a laser that emits a structured light pattern (e.g., line). In an example where there are two or more image capture devices, they are effective to capture the structured light pattern as it intersects with the article to determine a dimensionality (e.g., size in a three-dimensional space) of the article to determine a tool path for a future spraying operation on one or more surfaces of the article. In an aspect, the image capture device(s) and laser move to scan the article while the article remains stationary. In an alternative example, the image capture device(s) and laser move while the article moves during a scanning process. In yet another example, the image capture device(s) and laser remain stationary while the article moves during a scanning process.

The application module 114 applies a material, such as an adhesive, to the article. The application module 114 is configures to limit application of the material to portions of the system 100 (e.g., a cradle and track conveying the cradle) through the use of moveable masks and/or one or more brushes. The result of the application module 114 is an application of material onto an intended surface(s) of an article being conveyed through the system 100 while minimizing or correcting any material application that is not intended, such as an overspray onto portions of the system 100 that will convey through the system 100. The application module 114 will be discussed in greater detail in connection with at least FIGS. 13-18.

The cradle cleaning module 116 is effective to remove material that has accumulated on the cradle from the spraying module. In a continuous manufacturing environment, having a cleaning module in the production line of the system 100 allows for the process to continue with less downtime spent cleaning or otherwise clearing a component of the system of unwanted material, such as adhesive that remained with the cradle. The cradle cleaning module 116 will be discussed in connection with at least FIG. 19.

The system 100 is also comprised of a computing device 118. The computing device 118 is logically coupled (e.g., wired or wirelessly) with modules and elements of the system 100. For example, the computing device 118 is effective to coordinate the regulated dispensing of an article by the loading module 106, to control one or more actuators in the alignment module 108, to control one or more mechanisms in the cradle loading module 110 to effectively load an article in a cradle, to capture and process image data from the vision system 112, to determine an appropriate tool path based on scan data, to execute a tool path with the application module 114, to control a cleaning operation by the cradle cleaning module 116, and/or control movement of conveyance 104. The computing device 118 may be a plurality of computing devices. The plurality of computing devices may communicate together or they may operate independently. In an example two or more computing devices represented by the computing device 118 may work in coordination to control one or more aspects of the system 100.

A computing device, such as the computing device 118, may process computer code or machine-useable instructions, including computer-executable instructions such as program components, being executed by a computer or other machine, such as a programmable logic controller ("PLC"). Generally, program components, including routines, programs, objects, components, data structures, and the like, refer to code that performs particular tasks or implements particular abstract data types. The computing device 118 may be practiced in a variety of system configurations, including handheld devices, consumer electronics, general-purpose computers, personal computers, specialty computing devices, controllers, PLC, etc. Aspects hereof may also be practiced in distributed computing environments where tasks are performed by remote-processing devices that are linked through a communications network.

A computing device, such as the computing device 118, may include a bus that directly or indirectly couples the following devices: memory, one or more processors, one or more presentation components, input/output (I/O) ports, I/O components, and a power supply. Aspects hereof are contemplated as being performed in whole or in part on one or more components of a distributed computing system. It is contemplated that a distributed computing system may be comprised of processors, networks, and memory that scale to handle as desired level of computing processes at a time. Therefore, it is contemplated that a computing device may also refer to the computing environment of a distributed computing system that dynamically changes with time and/or demand.

Computing device 118 typically includes a variety of computer-readable media. Computer-readable media can be any available media that can be accessed by computing device 118 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory includes computer-storage media in the form of volatile and/or nonvolatile memory. The memory may be removable, nonremovable, or a combination thereof. Exemplary memory includes non-transitory, solid-state memory, hard drives, optical-disc drives, etc. Computing device 118 includes one or more processors that read data from various entities such as a bus, a memory, and/or I/O components. Presentation component(s) present data indications to a person or other device. Exemplary presentation components include a display device, speaker, printing component, vibrating component, etc. I/O ports allow computing device 118 to be logically coupled to other devices including I/O components, some of which may be built in.

Therefore, it is contemplated that one or more mechanisms, devices, modules, and/or components of the system 100 are directly or indirectly coupled with the computing device 118 allowing the computing device 118 to provide instruction thereto. As such, the computing device allows for an automated spraying of an article with limited human intervention on a continuous basis.

While specific modules and elements are depicted and discussed in connection with the system 100, it is contemplated that any of the modules/elements may be omitted. Additionally, it is contemplated that alternative configurations of one or more of the modules/elements of the system 100 may be implemented. Furthermore, it is contemplated that additional modules/elements may also be included with the system 100 in some aspects.

Figure 2:
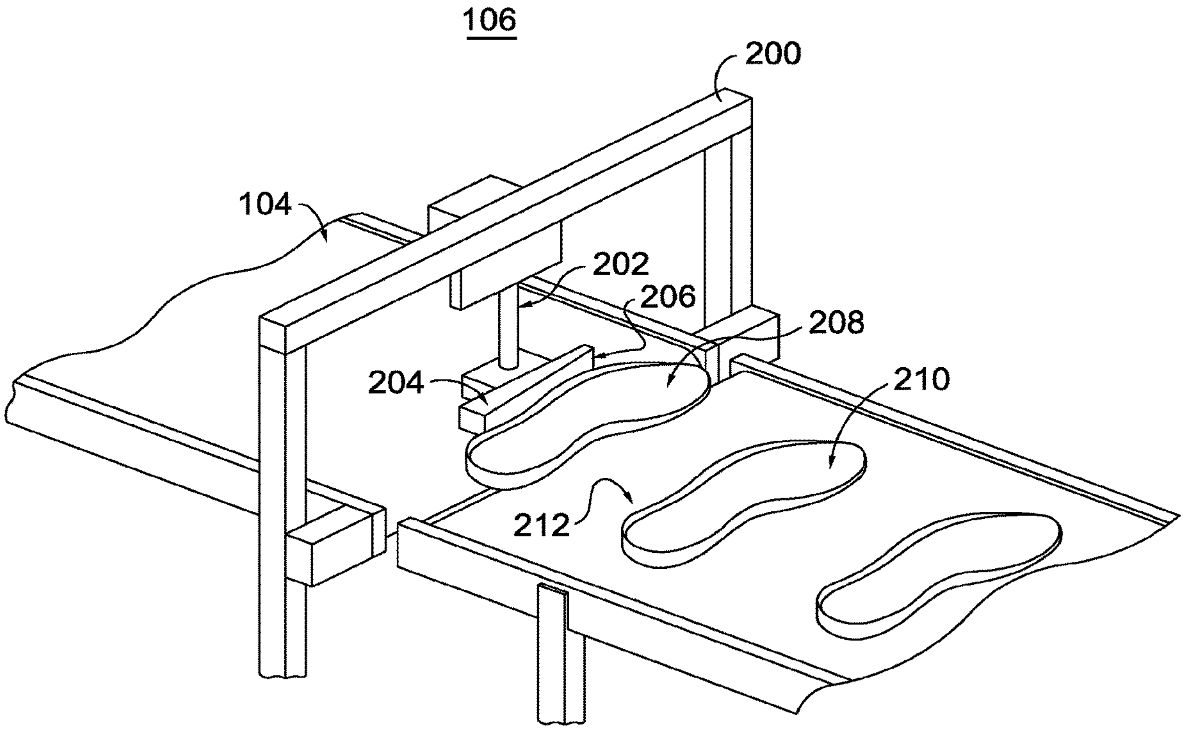
FIG. 2 depicts an example of a loading module that may be used in connection with the system of FIG. 1, in accordance with aspects hereof.
Figure 3:
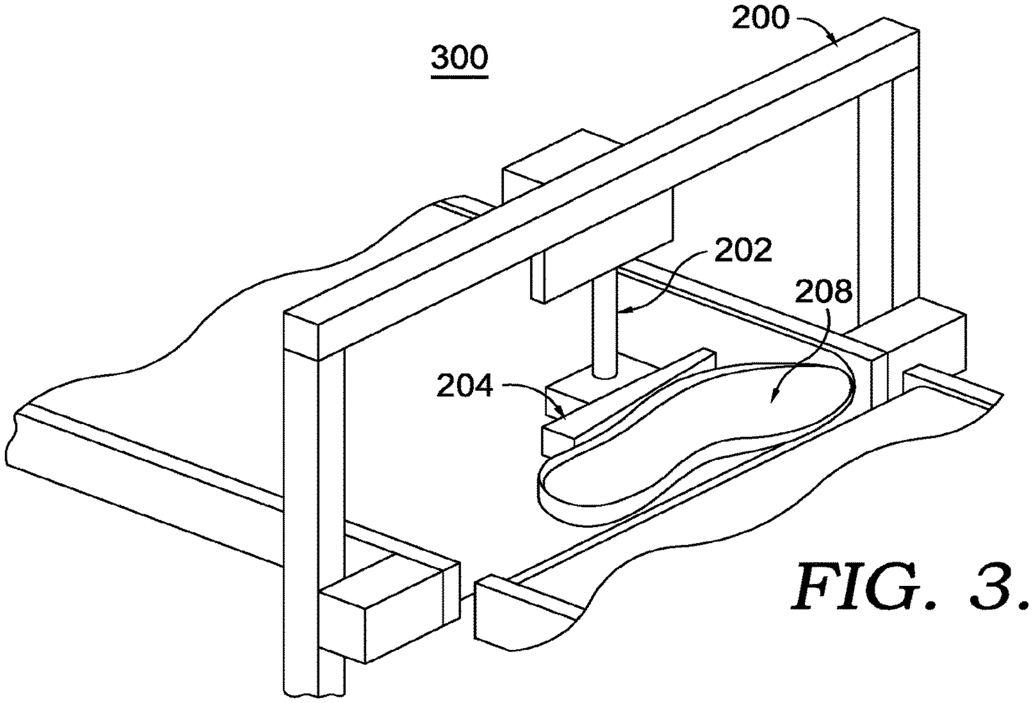
FIG. 3 depicts the loading module of FIG. 2 in a blocking configuration, in accordance with aspects hereof.
Figure 4:
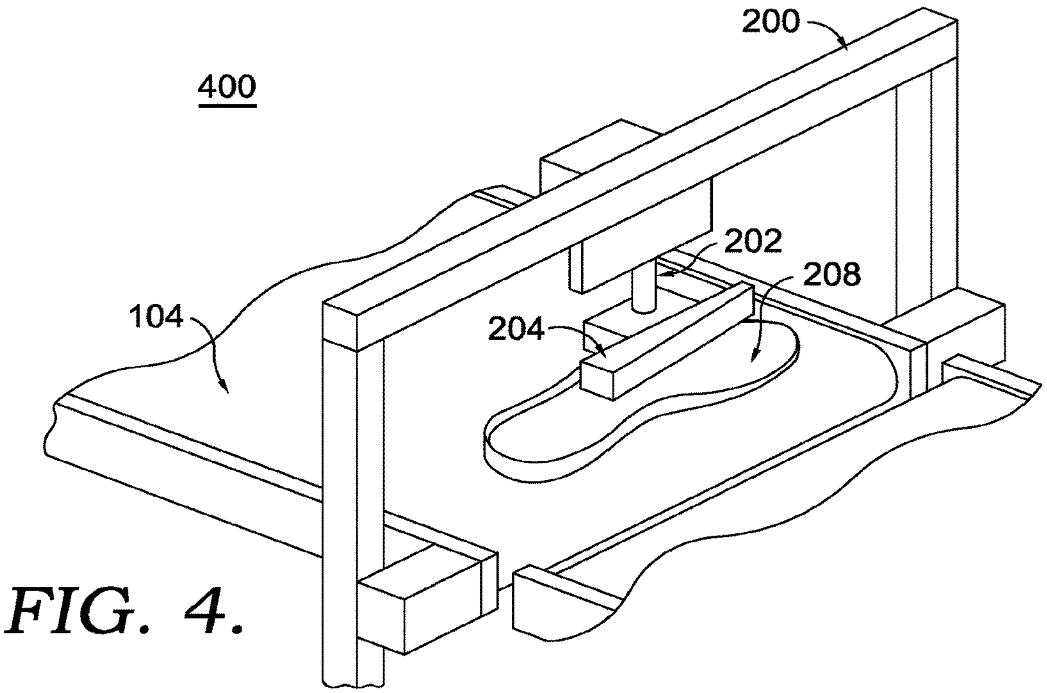
FIG. 4 depicts the loading module of FIG. 2 in a raised position, in accordance with aspects hereof.

FIGS. 2-4 depict the loading module 106 in a sequence of configurations to regulate the introductions of articles into the system 100 of FIG. 1. Turing specifically to FIG. 2 that depicts an example of the loading module 106 that may be used in connection with the system of FIG. 1, in accordance with aspects hereof. The loading module is comprised of a progress blocker 200 that has an actuator 202 and a blocker body 204. The blocker body 204 has a blocker body surface 206 that is effective to engage with the articles, such as a footwear component 208 and a second footwear component 210. An actuator is an actuation mechanism, such as a pneumatic actuator, hydraulic actuator, electric linear actuator, cable actuation, cam actuation, and the like. As used herein, the term actuator may represent any actuation mechanism contemplated unless explicitly indicated to the contrary. The blocker body 204 may be formed from any material in any shape. For example, the blocker body 204 may be formed from a polymeric composition, a metallic composition, or other composition. The blocking body may be shaped to receive and inhibit an article from progressing. For example, the blocker body 204 may have a length in the transverse direction of the material flow direction that is effective to prevent a rotation of an article around the blocker body 204 to continue progress along conveyance 104.

As previously discussed, the articles may be introduced into the system by a variety of uncontrolled means. The article may be introduced into the system in any cadence or volume, which can disrupt an ability to effectively spray the individual articles. Even when the articles are introduced in a methodical way, such as by a human operator approximately orienting and placing the articles on a second conveyor 212 feeding the system 100, the timing of the article arrival at the system 100 may not be coordinated with one or more processes (e.g., a spraying operation at the spraying module) that is/are occurring in the system. Therefore, aspects implement the loading module 106 to effectively time and space the conveyance of an article into the system in an intentional and controlled manner that allows the system to effectively intake articles.

As seen in FIG. 2, the second conveyor 212 may have a number of articles, such as footwear components 208, 210 that are being conveyed towards the system. In this example, each of the articles have been generally oriented and positioned on the second conveyor 212, but they are not precisely positioned or spaced. For example, the footwear component 208 and the footwear component 210 are both oriented in a toe-to-heel direction that is transverse to a longitudinal direction of the second conveyor 212. This may be accomplished by a human operator that unloads a collection of articles on to the second conveyor 212, but is not required to precisely position, space, or time the unloading. As the articles approach the loading module 106, the blocker body is positioned by the actuator 202 to impede the movement of the article until the system in the material flow direction is ready to receive the article. Therefore, it is contemplated that the second conveyor 212 may continue to convey the articles, such as the footwear component 208, 210, towards the system regardless of the blocker body position. The blocker body 204, when in a blocking position, prevents the footwear component 208 from advancing even if the second conveyor 212 continues to convey the footwear component 210 toward the blocked footwear component 208. In an alternative aspect, the second conveyor 212 stops conveying once an article, such as the footwear component 208, contacts the blocker body 204.

The blocker body 204 in a blocking configuration is positioned more proximate the conveyance 104 and/or the second conveyor 212 than when in a second configuration that allows for the conveyance of the article down the conveyance 104. Stated differently, the actuator 202 lowers the blocker body 204 to impede the progress of an article down the conveyance 104 and the actuator 202 raises the blocker body 204 to allow for the conveyance of the article down the conveyance 104. The position of the blocker body 204 as positioned by the actuator 202 may be controlled by a computing device such as the computing device 118 of FIG. 1. As previously discussed, the position of the blocker body 204 that either allows or inhibits progress of the article may be adjusted to regulate the timing of the article's conveyance. As such, the position of the blocker body 204 may control a delivery cadence of the system as a whole.

FIG. 3 depicts the loading module 106 of FIG. 2 in a blocking configuration 300, in accordance with aspects hereof. As depicted in FIG. 3, the actuator 202 is in an extended configuration to position the blocker body 204 in a location effective to impeded progress of the footwear component 208 through the system. The blocker body 204 contacts the footwear component 208, which obstructs the movement of the footwear component 208 along the conveyance 104. The position of the actuator 202 may be controlled by a computing device.

FIG. 4 depicts the loading module 106 of FIG. 2 in a raised configuration 400, in accordance with aspects hereof Unlike FIG. 3 that impeded the movement of the footwear component 208 along the conveyance 104, FIG. 4 illustrates that when in the raised configuration, the blocker body 204 no longer impedes the progress of the footwear component 208 along the conveyance 104. The raised position is accomplished through a change in position of the blocker body 204 caused by the actuator 202. The actuator may be instructed to raise by a computing device coordinating the intake of articles to the system.

Figure 5:
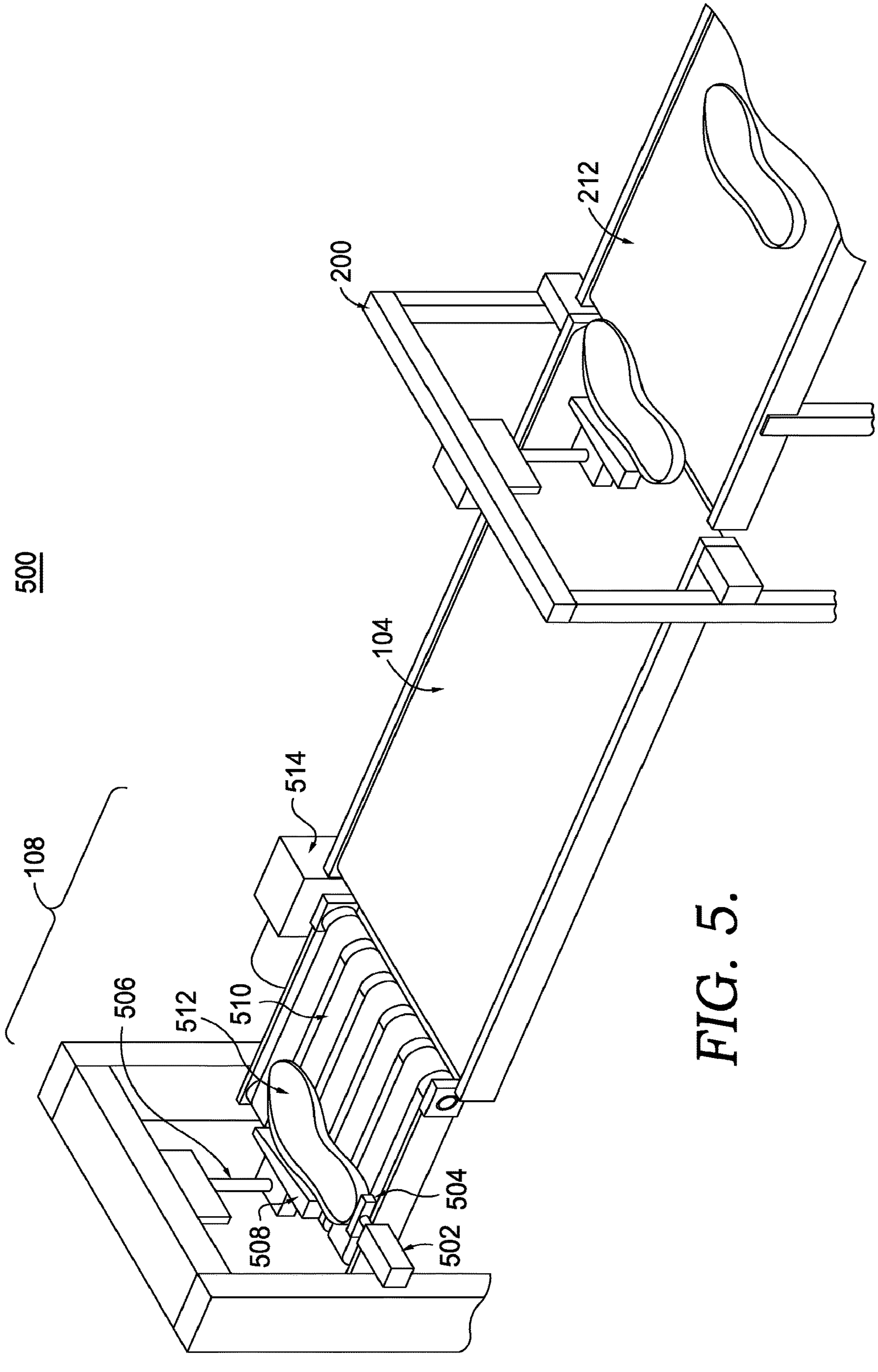
FIG. 5 depicts the loading module of FIG. 2 and an alignment module that may be used in connection with the system of FIG. 1, in accordance with aspects hereof.

FIG. 5 depicts the loading module 106 of FIG. 2 and the alignment module 108 that may be used in connection with the system of FIG. 1, in accordance with aspects hereof. An article, such as a footwear component 512, is conveyed down the conveyance 104 to the alignment module 108. The alignment module 108 is comprised of a conveyance belt 510, a conveyance belt drive 514, a transverse actuator 502, a transverse body 504, a position actuator 506, and a position body 508. The transverse actuator 502 and the position actuator 506 may be any actuation mechanisms contemplated herein, such as a pneumatic, a hydraulic, or an electric linear actuator. The actuation mechanism may be controlled by a computing device, such as computing device 118 of FIG. 1. The conveyance belt drive 514 may be any drive mechanism, such as an electric motor, a pneumatic motor, or a hydraulic motor. The conveyance belt drive 514 is effective to cause the conveyance belt 510 to covey (e.g., rotate). The conveyance belt drive 514 may be logically coupled with a computing device (e.g., computing device 118 of FIG. 1) to selectively (e.g., speed, direction, start/stop) rotate the conveyance belt 510.

The conveyance belt 510 is comprised of a plurality of belts portions arranged in a parallel configuration. As will be depict in at least FIGS. 6-8 herein, the spaced apart, but parallel, relationship of the belt sections allows for a movement mechanism having a plurality of tines to convey an article from the conveyance belt 510 to a cradle. The space between each belt portion is referenced in FIG. 6 as a belt gap 602. The belt gap 602 allows for one or more tines to pass through the conveyance belt 510 to move the article to a cradle or other module. The belt portions may be formed from any material and have any size/shape. In some aspects the belt portions are O-rings, which may be formed from an elastomeric material. In other aspects the belt portions are a band, such as a fiber-reinforced material. Other materials and form factors are contemplated. The conveyance belt 510 conveys an article from the conveyance belt drive 514 to the position body 508. The conveyance belt 510, as rotated by the conveyance belt drive 514 may stop conveying the article upon contact of the article (e.g., footwear component 512) with the position body 508. In the alternative, the conveyance belt drive 514 may continue to move the conveyance belt 510 such that the position body 508 impedes movement of the article in the material flow direction.

Figure 6:
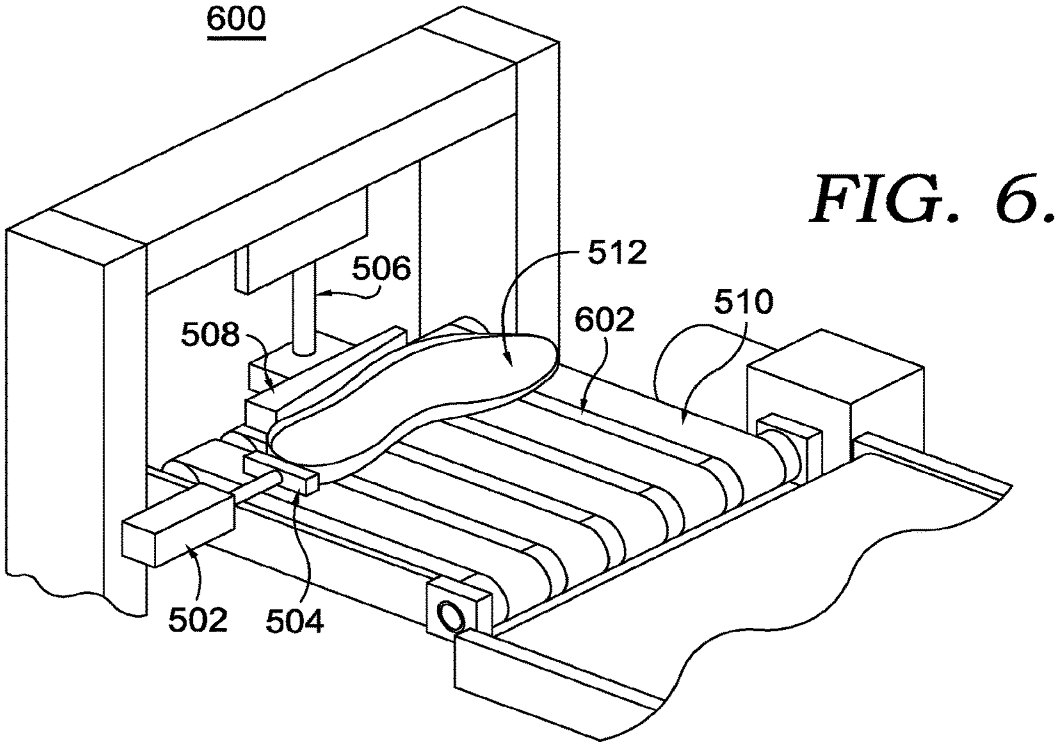
FIG. 6 depicts the alignment module of FIG. 5 in an alignment configuration, in accordance with exemplary aspects hereof.

The alignment module 108 is effective to appropriately position the article for eventual positioning in a cradle. To accomplish this alignment in positioning, the alignment module 108 adjusts a transverse position of the article, such as the footwear component 512, through movement of the transverse body 504 by the transverse actuator 502. As best seen in FIG. 6 which depicts the alignment module 108 of FIG. 5 in an alignment configuration 600, in accordance with exemplary aspects hereof. The transverse actuator 502 is in an extended position to bring the transverse body 504 into contact with and reposition that footwear component 512 in a transverse direction to the material flow direction 102 of FIG. 1. The transverse actuator 502 selectively extends to appropriately place the footwear component 512 on the conveyance belt 510. The selective extension may be determined by a computing device, such as the computing device 118 of FIG. 1. The selective extension may be determined, at least in part, by one or more sensors or a known selective extension for a specific footwear component being processed. This transverse alignment prepares the footwear component 512 to be conveyed by a movement mechanism 702, as will be discussed in connection with at least FIGS. 7-10.

Furthermore, the alignment module 108 is capable of positioning and maintaining a position of the footwear component 512 in the material flow direction through selective actuation of the position actuator 506 and the associated position body 508. As seen in FIG. 6, the position actuator 506 is in an extended configuration that causes the position body 508 to engage with and therefore impeded forward movement of the footwear component 512 at a specified location as dictated by the position of the position body 508 in the material flow direction. As such, through extension of the transverse actuator 502, the transverse position of the footwear component 512 may be aligned and through extension of the position actuator 506, the position of the footwear component 512 in a material flow direction may be maintained.

Figure 7:
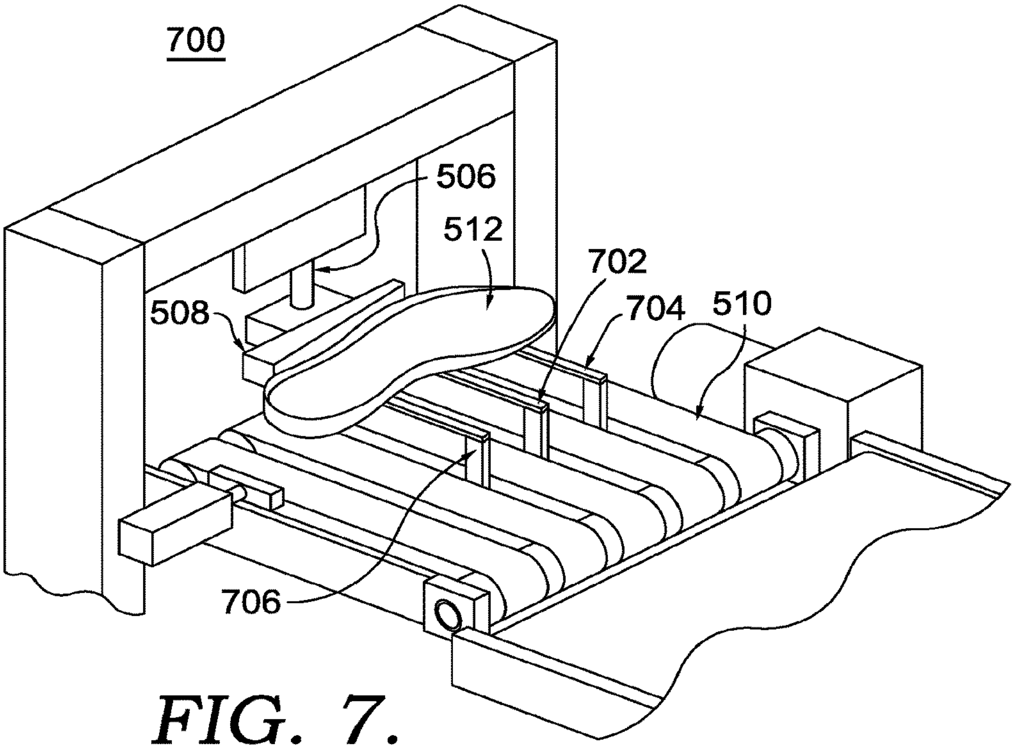
FIG. 7 depicts the alignment module of FIG. 5 in a loading configuration for a footwear component, in accordance with aspects hereof.

FIG. 7 depicts the alignment module 108 of FIG. 5 in a loading configuration 700 for an article, such as the footwear component 512, in accordance with aspects hereof. The movement mechanism 702 is extending through the plurality of belt portions forming the conveyance belt 510. In particular, the movement mechanism 702 is comprised of a plurality of tines, such as a first tine 704 and a second tine 706. Each of the tines passes through a belt gap of the conveyance belt 510. It is this belt gap between the belt portions that allows for the movement mechanism 702 to effectively transfer the article from the alignment module 108 to the cradle loading module 110 without affecting the alignment/position of the article during the transfer. For example, the movement mechanism 702 lifts the article from below without sliding under the article from a transverse direction or a material flow direction, which could unintentionally position the article. This vertical engagement allows for a transfer of the article from the conveyance belt 510 to the movement mechanism 702 with minimal movement of the article in the transverse or material flow directions.

As depicted in FIG. 7, the transverse actuator is in a retracted configuration, which prevents unintentional engagement between the transverse body 504 and the footwear component 512 during a lifting process by the movement mechanism 702. Also depicted is the position body 508 and associated position actuator 506 in the process of retracting to a retracted position, which allows for the eventual movement of the footwear component 512 in the material flow direction by the movement mechanism 702. In some aspects, the position body 508 moves in conjunction with the footwear component 512 as it is raised by the movement mechanism 702 to ensure appropriate alignment is maintained by the footwear component as it transfers from the conveyance belt 510 to the movement mechanism 702. In this example, the position actuator 506 will continue to retract to a sufficient position that allows the movement mechanism 702 to move the footwear component 512 in a material flow direction without being impeded by the position body 508. In an alternative example, the position actuator 506 retracts the position body 508 prior to or at a great rate than the raising of the tines of the movement mechanism 702. In this example, the prior retraction of the position actuator 506 prevents the position body 508 from interfering with the movement of the footwear component 512 by the movement mechanism 702.

The movement mechanism 702 is able to move in a vertical direction to lift the article from the conveyance belt. The movement mechanism 702 is also able to move in the material flow direction. Either movement may be controlled by a computing device, such as the computing device 118 of FIG. 1. Additionally, the movement in the either direction may be accomplished through one or more mechanisms, such as an actuation mechanism, geared movement, rotational drives, pulleys, and the like. Any combination of movement generators may be leveraged to move and position the movement mechanism 702.

Figure 8:
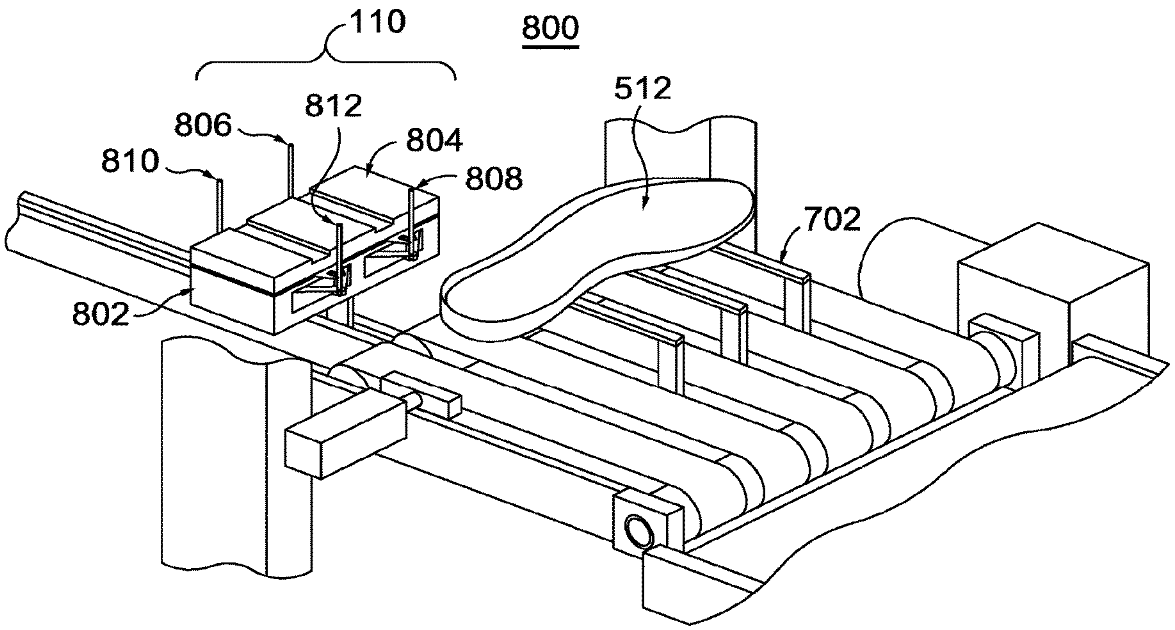
FIG. 8 depicts the footwear component being loaded into a cradle loading module that may be used in connection with the system of FIG. 1, in accordance with aspects hereof.

FIG. 8 depicts the footwear component 512 being loaded into the cradle loading module 110 that may be used in connection with the system of FIG. 1, in accordance with aspects hereof. The cradle loading module 110 is comprised of a cradle 802 that is effective to maintain and transport an article, such as the footwear component 512, through the vision system 112 and the application module 114, both of FIG. 1. The cradle 802 is comprised of a cradle support surface 804, a first finger 806, a second finger 808, a third finger 810, and a fourth finger 812.

The cradle support surface 804 provides a vertical supporting platform for the article when secured in the cradle 802. In an example, the cradle support surface 804 includes recessed portions sized and positioned to receive each of the tines of the movement mechanism 702. The recessed portions allow for the tines to recess below the supporting surface sufficiently for an article to be supported by the cradle support surface 804 and the tines to withdraw from the cradle 802 while leaving the article at the cradle 802.

Figure 9:
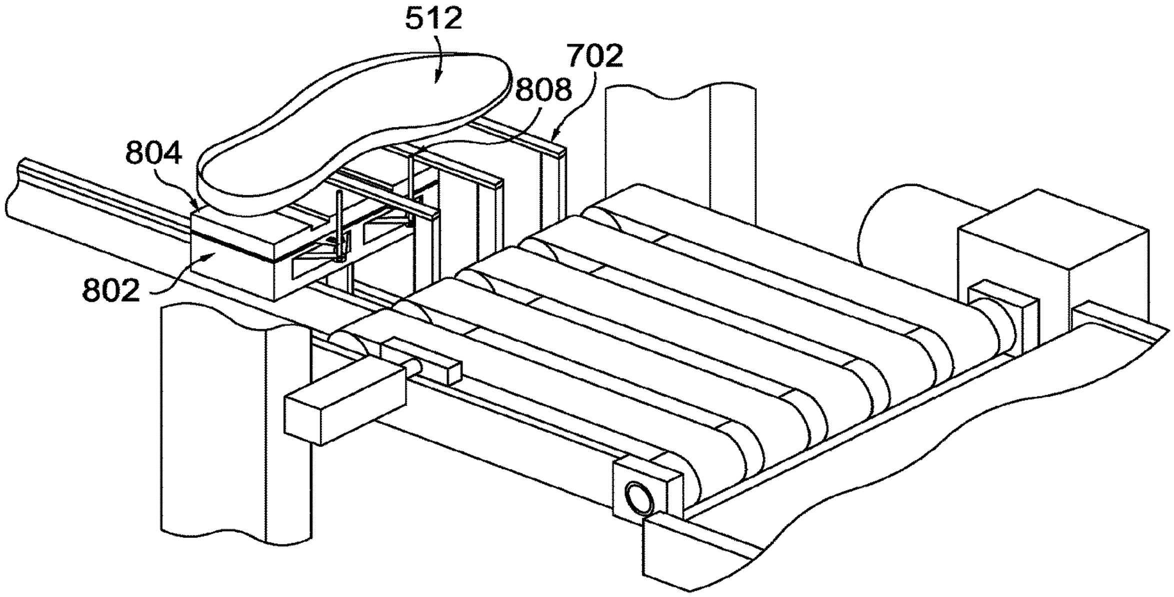
FIG. 9 depicts the footwear component being loaded in a cradle of the cradle loading module of FIG. 8, in accordance with aspects hereof.

FIG. 9 depicts the footwear component 512 being loaded in the cradle 802 of the cradle loading module 110 of FIG. 8, in accordance with aspects hereof. In this snapshot of a loading sequence, the movement mechanism 702 is depositing the footwear component 512 on the cradle support surface 804 between the fingers. The cradle 802 is in a resting position, as will be described in detail at FIGS. 11A-11B.

Figure 10:
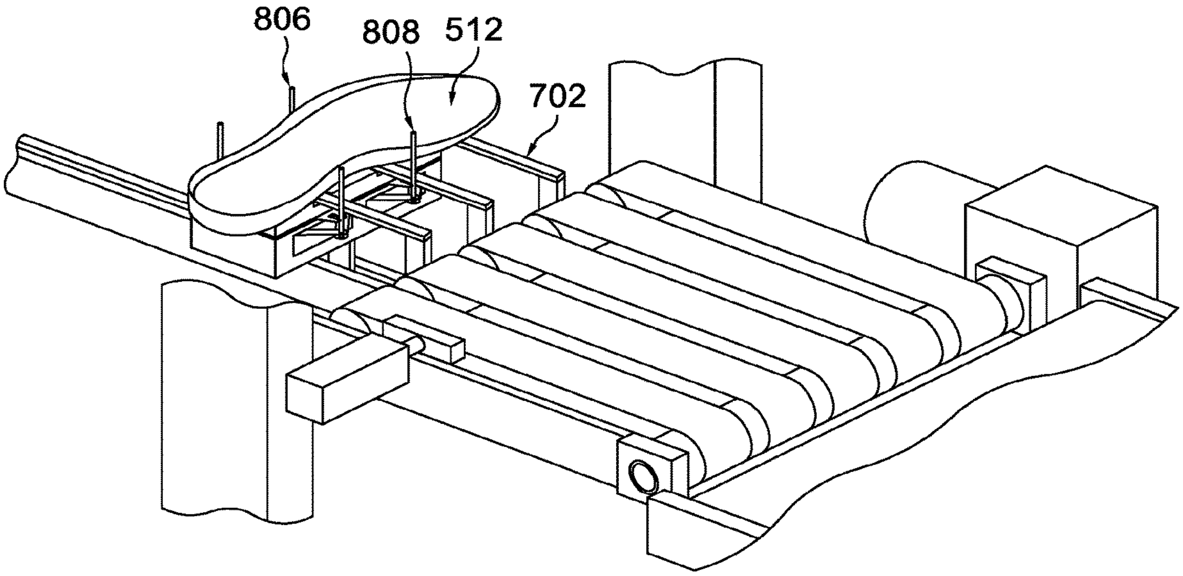
FIG. 10 depicts the cradle loading module of FIG. 8 in an activated position, in accordance with aspects hereof.

FIG. 10 depicts the cradle loading module 110 of FIG. 8 in an activated position, in accordance with aspects hereof. The activated position will be discussed in additional detail in connection with FIGS. 11C-D. In the activated position, the fingers (e.g., first finger 806 and second finger 808) of the cradle 802 are securing, such as through compression, the footwear component 512 within the cradle 802. As also depicted in FIG. 10, the movement mechanism 702 is retracting from the cradle after having deposited the footwear component 512 at the cradle 802.

Figure 11A:
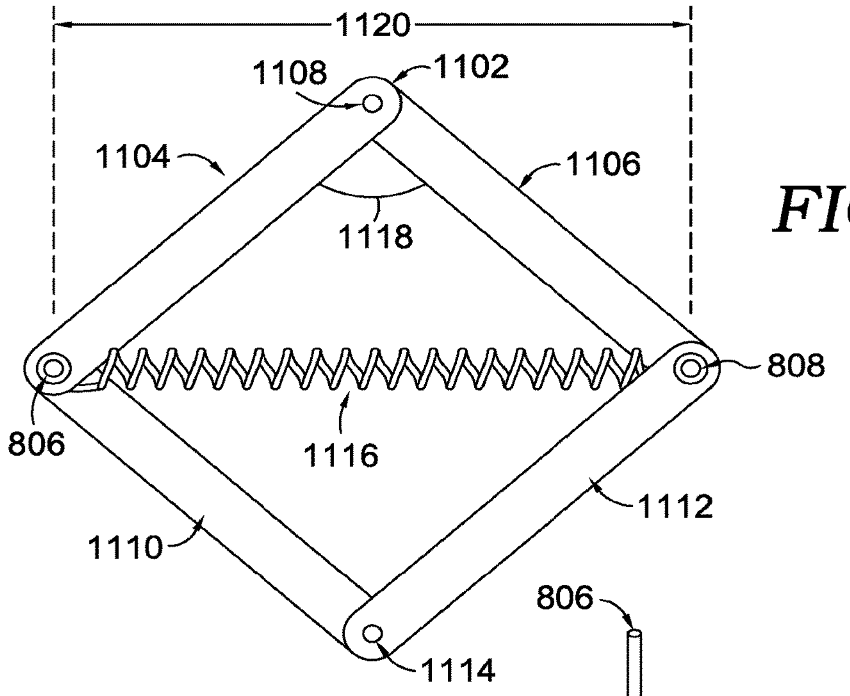
FIG. 11A depicts a plan view of a multi-part linkage of the cradle loading module of FIG. 8 in the activated position, in accordance with aspects hereof.

Turning to FIGS. 11A-11D, which each depict a multi-part linkage 1102 of the cradle 802 of FIG. 8, in accordance with aspects. Specifically, FIG. 11A depicts a plan view of the multi-part linkage 1102 in the activated position, in accordance with aspects hereof. The multi-part linkage 1102 is comprised of a first link 1104, a second link 1106, a pivot joint 1108, a third link 1110, a fourth link 1112, a pivot joint 1114, and a tension spring 1116. Also depicted is the first finger 806 and the second finger 808, whose relative position is controlled by the multi-part linkage 1102. In use, it is contemplated that the cradle 802 is comprised with at least two multi-part linkages. For example, the first finger 806 and the second finger 808 are associated with a first multi-part linkage and the third finger 810 and the fourth finger 812 are associated with a second multi-part linkage. Having multiple multi-part linkages allows for multiple points of compression on the article within the cradle as each multi-part linkage allows for a compression of the article to occur. In an example, the multi-part linkage is a quad linkage, as depicted in FIGS. 11A-D.

Figure 11B:
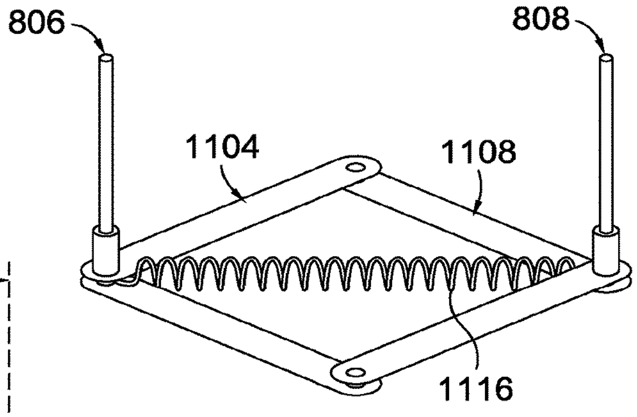
FIG. 11B depicts a perspective view of the multi-part linkage of the cradle loading module of FIG. 8 in the activated position, in accordance with aspects hereof.

The multi-part linkage 1102 in FIGS. 11A-b is in an activated configuration such that the first finger 806 and the second finger 808 are spaced apart a distance 1120. The distance 1120 is sufficient to receive the article there between. Stated differently, the activated configuration provides a distance between the fingers that is sufficiently large enough that the article may be positioned between the fingers while they remain in the activated position. In an example, the activated position may be defined by an angle 1118, which is greater than an angle 1122 of FIG. 11C in the resting position.

Figure 11C:
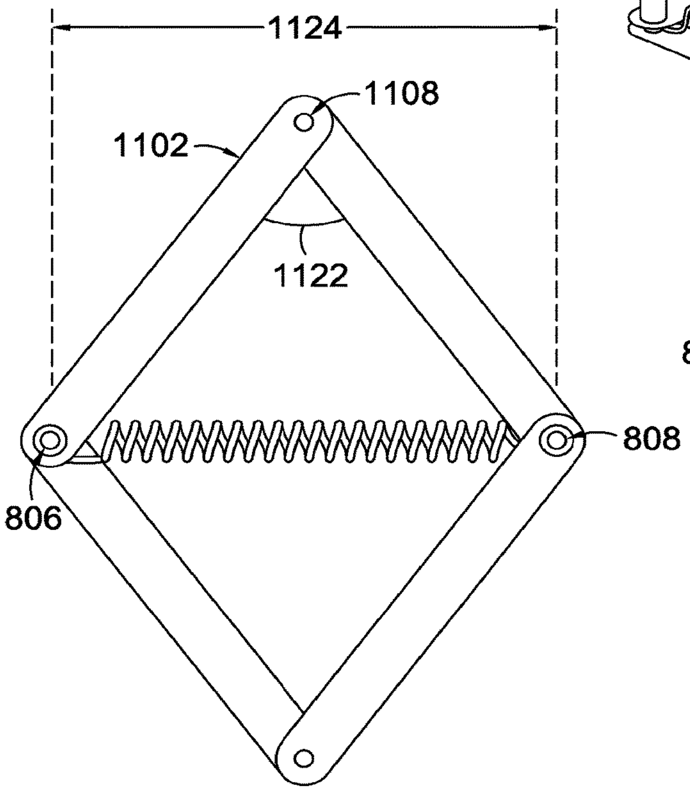
FIG. 11C depicts a plan view of the multi-part linkage of the cradle loading module of FIG. 8 in a resting position, in accordance with aspects hereof.
Figure 11D:
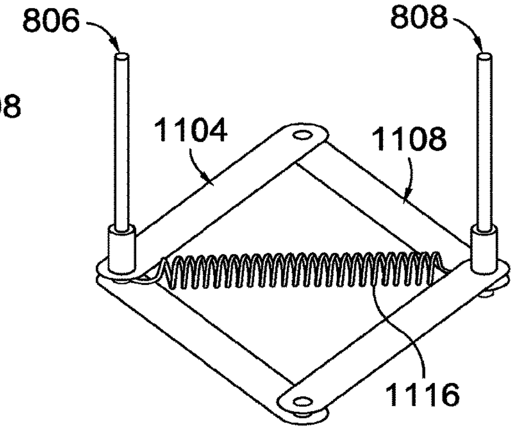
FIG. 11D depicts a perspective view of the multi-part linkage of the cradle loading module of FIG. 8 in the resting position, in accordance with aspects hereof.

The multi-part linkage 1102 is biased by the tension spring 1116 to the resting position of FIGS. 11C-11D. It is this biased approach that supplies the compressive force used to maintain the article in the cradle during subsequent operations. To achieve the activated position, in an example, a force is applied that brings the intersection of the first link 1104 and the second link 1106 (e.g., proximate the pivot joint 1108) and the intersection of the third link 1110 and the fourth link 1112 (e.g., proximate the pivot joint 1114) towards one another. This force may be generated by an actuation mechanism, such as a pneumatic actuator. Other force generators are contemplated. The force generation to bring the multi-part linkage 1102 into an activated position may be controlled by a computing device, such as the computing device 118 of FIG. 1. It is contemplated that the cradle loading module 110 include a set of actuators positioned to convert the multi-part linkage 1102 from the resting position as biased by the tension spring 1116 to the activated position (e.g., increased distance between fingers allowing for reception of an article in the cradle). The actuators may apply a compressive force to the multi-part linkage 1102 proximate the pivot joint 1108 and pivot joint 1114. This compressive force is greater than the tensile force generated by the tension spring 1116 causing the multi-part linkage 1102 to pivot about the intersections of the links to move from the resting position of FIGS. 11C-D to the activated position of FIGS. 11A-B FIGS. 11C-D depict the multi-part linkage 1102 in the resting position, in accordance with aspects hereof. Of note, in the resting position a distance 1124 between the first finger 806 and the second finger 808 is a smaller distance than the distance 1120 of FIGS. 11A-B. It is this distance that represents the ability to receive (e.g., when the distance is greater) an article and the ability to compress the article (e.g., when the distance is less) for maintaining and conveying the article. The multi-part linkage 1102 is biased into the resting position by the tensile force applied by the tension spring between the first finger 806 and the second finger 808 at the multi-part linkage 1102. An angle 1122 is another indication of the multi-part linkage 1102 in the resting position. For example, a more acute angle represents a resting position as compared to the larger angle of angle 1118 of FIGS. 11A-B in the active position. The larger the angle, the larger the article to be received between the fingers and the smaller the angle the greater the compression achieved on the article.

While a configuration is depicted having a tensile spring extending between the first finger 806 and the second finger 808 as a mechanisms for achieving a biasing force towards the resting position, is it also contemplated that a compressive element (e.g., gas piston, compressive spring) may alternatively (or additionally) extend between the pivot joint 1108 and the pivot joint 1114. In this example, the compressive force between the pivot joints are also effective to bias the multi-part linkage to the resting position. In yet an additional example, it is contemplated that a biasing mechanisms is omitted and instead one or more elements position the multi-part linkage in a desired configuration and the multi-part linkage maintains the set configuration. For example, one or more friction locks (or other locking mechanisms) may maintain a relationship between two links. For example, a friction lock may resist pivoting between the first link 1104 and the second link 1106 at the pivot joint 1108. This friction lock therefore aids in maintaining the multi-part linkage 1102 in a set configuration by an exterior force (e.g., one or more actuators at the cradle loading module 110.

Figure 12:
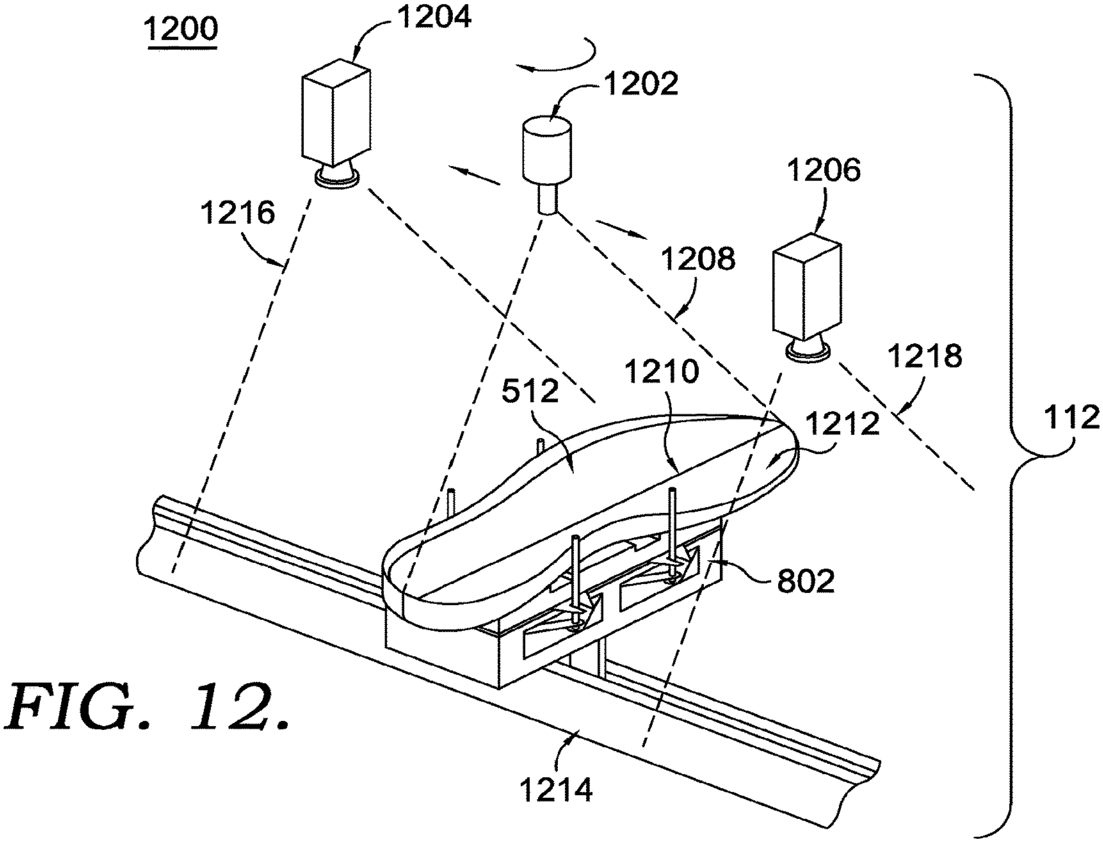
FIG. 12 depicts a vision system that may be used in connection with the system of FIG. 1, in accordance with aspects hereof.

FIG. 12 depicts the vision system 112 that may be used in connection with the system 100 of FIG. 1 to capture dimensional surface information of an article, in accordance with aspects hereof In this example, the vision system is comprised of a structured light source, such as a laser 1202, one or more image capture devices, such as a first image capture device 1204 and a second image capture device 1206. The laser 1202 is moveable and/or rotatable in three dimensions to effective create a scan motion across a surface to be captured. Similarly, it is contemplated that the first image capture device 1204 and the second image capture device 1206 are moveable and/or rotatable in three dimensions. It is contemplated that the laser 1202 and the one or more image capture devices may be moveable and/or rotatable in coordination with each other. Additionally, it is contemplated that the laser and image capture devices may move in coordination while the laser rotates independently of the image capture devices during the movement thereof.

The laser 1202 emits a laser light pattern 1208 that upon intersection with an article, such as a surface 1212 of the footwear component 512, a laser light line 1210 is produced. The laser light line 1210 is a result of the structure light emitted by the laser 1202 intersecting with the article. In this example, the structured light pattern generates a linear representation; however, it is contemplated that any structured light pattern may be leveraged. Examples of alternative structured light patterns include a grid-like structure.

The laser 1202 may emit energy at any frequency. For example, the frequency may be in the ultraviolet, infrared, and/or visible light spectrum. Additionally, the light may be pulsed at a known or variable frequency. The light may be maintained constant (not pulsed). Any type of laser or other structured light emitter is contemplated in connection with the vision system 112.

The first image capture device 1204 and the second image capture device 1206 may be any type of image capture device. An image capture device may be a camera, such as a charge-coupled device camera (CCD) or a complementary metal-oxide semiconductor camera (CMOS). The image capture devices may capture a plurality of still images (e.g., coordinated with a structure light emission) and/or continuous (e.g., high shutter speed). The image capture devices may capture any frequency of light, such as visible light. As such, it is contemplated that the image capture device(s) is cable of capturing the laser light line 1210 as formed on the footwear component 512. Each image capture device is configured and positioned such that a field of view, such as a first field of view 1216 and a second field of view 1218 are effective to simultaneously capture the laser light line 1210. Simultaneous capture of the laser light line 1210 provides a stereoscopic vision that produces a three-dimensional mapping of the footwear component 512. The relative positioning of the vision system components, in an example, provides enhanced surface mapping for an article of footwear component. As will be discussed herein, it is contemplated that a cup-like structure may form the foot-facing surface of a shoe sole being scanned. This non-planar structure present challenges for some vision configurations. As such, it is contemplated that the first image capture device 1204 is on a first side of the laser 1202 and the second image capture device 1206 is on an opposite side of the laser 1202. This relationship allows for an effective stereoscopic image capture while also allowing for the surface mapping of the foot-facing surface of a sole having complex curves.

Additional solutions are contemplated for capturing a surface mapping. For example, the vision system may be comprised of a three-dimensional camera capable of capturing three dimensional data. Examples include time of flight technology as a vision system.

The vision system 112 is logically coupled with a computing device, such as the computing device 118 of FIG. 1. The computing device is effective to control the position/or orientation of the first image capture device 1204, the second image capture device 1206, the laser 1202, and the timing of operations of each. Further, it is contemplated that the computing device is also effective to translate date received representing an image from each of the image capture devices into a mapping of a surface of the footwear component 512 exposed to the vision system. The production of a three-dimensional mapping of the surface is accomplished through a combination of images captured from the physically offset image capture devices at a common time. Discrepancies in images captured at a common time from the offset image capture devices can be interpreted to determine dimensional data in three-dimensional space of the footwear article.

In use it is contemplated that the cradle 802 moves along a rail 1214. The rail extends from the cradle loading module 110 of FIG. 10, for example, toward the application module 114 of FIG. 13. In an example where a common rail, such as the rail 1214, extends from the vision system 112 through the application module 114, it is contemplated that the cradle 802 remains stationary in the vision system 112 (e.g., pauses movement) while a cradle on the same rail is maintained stationary in the application module 114 during an application process. For example, it is contemplated that a common movement conduit (e.g., a chain drive, belt drive) moves all of the cradles on a common rail in unison. In this example, when one cradle is maintained stationary for a process to be performed, all of the other cradles on the same rail also stop because of the common movement conduit, in an example. Continuing with this example, it is contemplated that the image capture devices and/or laser of the vision system, 112 therefore moves relative to the stationary cradle 802 to capture various surfaces or portions of surfaces for the article. Stated differently, capturing three-dimensional data from a vision system relies on scanning the laser light line 1210 across the surface to be measured. This scanning operation can be accomplished by moving the surface relative to the light source and/or by moving the light source relative to the surface. Because aspects contemplated herein include synchronizing the movement of cradles through the system and some operations (e.g., spraying) of the system rely on having a stationary cradle, all other cradles in the same system also are maintained stationary at their respective locations during the operation on the one (or more) cradle(s) on which the stationary process is being performed. As such, aspects contemplate moving one or more portions of the vision system 112 during the stationary period of a cradle within the vision system. The movement of the vision system components (e.g., laser, camera) increases the through put of the system as multiple operation may be performed at different locations of the system during a stationary period for the cradles.

The information captured by the image capture devices while having the laser light line scanned across a surface of the article is used to generate a digital dimensional mapping of the surface, as depicted by operation 1200 of FIG. 12. The digital dimensional mapping is effective for a computing device to therefore generate a tool path for a subsequent application (e.g., spraying) operation to be performed on the article's surface. The tool path may be selected from existing tool paths. For example, a plurality of tool paths for various surfaces may be stored in a computing device. A determination as to which of the previously generated and stored tool path that is most effective for a scanned surface may be made and lead to a selection of the tool path. The generation of a tool path may additionally (or alternatively) include modifying an existing tool path to account for one or more dimensions determined from the visions system scan of the article's surface. In yet an additional (or alternative) example of a generation of a tool path, it is contemplated that one or more rules may be applied to a scanned surface to generate a tool path specific to the scanned surface. Stated differently, the dimensional data determined from the vision system 112 may be used to generate a unique tool path specific to the scanned surface. Various types of tool paths may be generated from the scanned data. In an example, the tool path is effective for an application of sprayed polyurethane ("PUR") adhesive to a surface of a footwear component surface.

Figure 13:
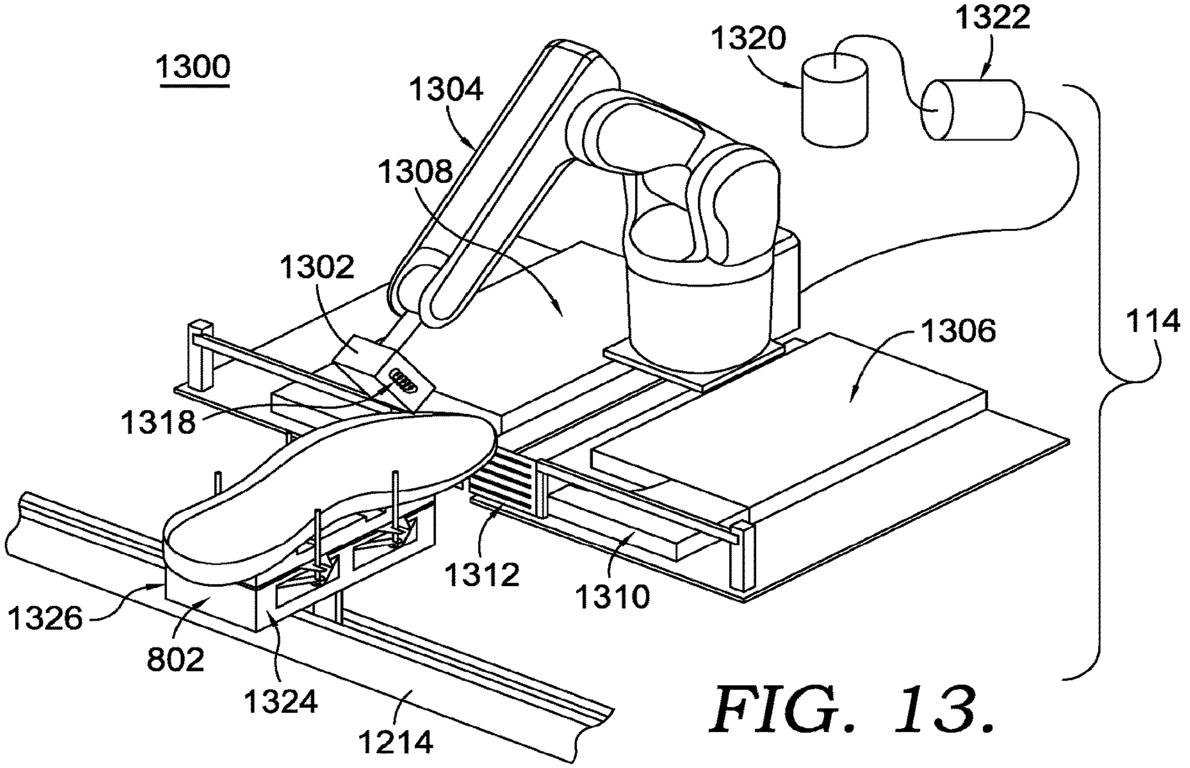
FIG. 13 depicts an application module that may be used in connection with the system of FIG. 1, in accordance with aspects hereof.
Figure 14:
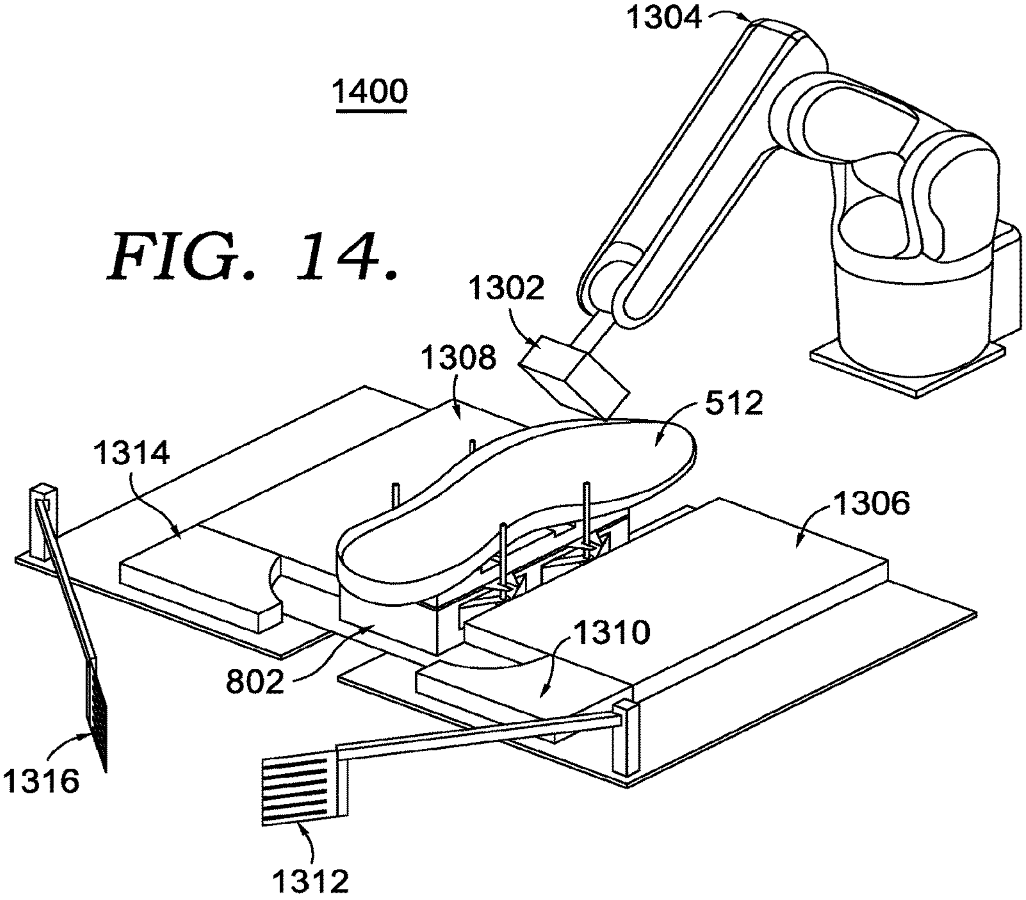
FIG. 14 depicts the application module of FIG. 13 having a masking platform in a first position, in accordance with aspects hereof.

FIGS. 13-18 depict a series of steps in an application process by the application module 114 of the system 100 of FIG. 1, in accordance with aspects hereof. The application module 114 is comprised of a spraying nozzle 1302, a multi-axis conveyance mechanism 1304, a masking platform comprised of a first portion masking platform 1306, a second portion masking platform 1308, a first portion secondary mask 1310, a first material brush 1312, a second portion secondary mask 1314, and a second material brush 1316 (as best seen in FIG. 14). The application module 114 is also contemplated to include a number of component useable in connection with application of polyurethane adhesive. Those components include a heater 1318, a melter 1320, and a pump 1322. The application module is also contemplated to include a scraper 1800, as will be depicted in FIG. 18 for cleaning the masking platform between an application process.

The application module 114 is effective to apply a material to a surface of an article. In the depicted example, the application module is effective to apply a polyurethane ("PUR") adhesive to a surface (e.g., a foot-facing surface of a footwear sole) of a footwear component. In a specific example, the application of material is intended for the surface previously scanned by the vision system 112 of FIG. 12. The PUR adhesive is an option in connection with article of footwear components as it provides a single-sided adhesive that may not require a primer or additional treatments. Further, use of a single-sided adhesive in the manufacture of footwear allows for the omission of operations that may be traditionally performed on the component to be mated (e.g., a lasted upper). For example, by leveraging a single-sided adhesive, like PUR, the traditional priming and application of adhesive to a lasted upper that would be joined with a primed and adhesive-bearing sole can be omitted.

In this specific example of PUR adhesive, the application of the PUR to the foot-facing surface of a shoe sole is accomplished by a digital tool path that is used to determine a position of the multi-axis conveyance mechanism 1304 for direction the spraying nozzle 1302 to expel PUR to the surface of the article previously scanned. The tool path is used to instruct the position and orientation of the spraying nozzle 1302 relative to the article for an effective coverage of PUR on the article's surface. The movement of the multi-axis conveyance mechanism 1304 is controlled by a computing device, such as the computing device 118 of FIG. 1. The computing device instructs the position and orientation that the multi-axis conveyance mechanism positions the spraying nozzle 1302. The computing device may leverage, at least in part, a tool path previously developed in connection with scanned information relating to the article from the vision system. Alternatively, the application module 114 may rely on stored instructions for applying the material to a surface of the article. For example, the article may be known and therefore the tool path to be followed by the spraying nozzle may be consistent for the known article, in an example. Further yet, it is contemplated that one or more image capture device are incorporated in the application module 114 to effectively guide the position of the spraying nozzle 1302 for real-time guidance, in an example.

The multi-axis conveyance mechanism 1304 is capable of moving in two or more directions. For example, a robotic arm having multiple degree of motion is an effective option. Other options include, but are not limited to and X-Y table or the like. The multi-axis conveyance mechanism 1304 may be electrically, pneumatically, and/or hydraulically powered. The multi-axis conveyance mechanism 1304 may be controlled by one or more computing devices, as previously discussed. The multi-axis conveyance mechanism 1304 may move in the X, Y, and/or Z directions with rotation about the X, Y, and/or Z direction in an example. These levels of freedom of motion allows for effective placement of the spraying nozzle 1302 for applying material, such as PUR adhesive, to a surface of an article.

The spraying nozzle 1302 is an outlet port for the material being applied to the article surface. It is contemplated that in some aspects the nozzle 1302 has a variable aperture allowing for different spray patterns and/or volumes. Additionally, as depicted, the spraying nozzle 1302 is contemplated to include the heater 1318. The heater 1318 is effective to elevate and maintain a temperature of the spraying nozzle 1302. Having an elevated temperature at the spraying nozzle 1302 allows for effective application of some materials therefrom. For example, to effectively apply a PUR-based adhesive, some aspects contemplate having a heated spraying nozzle to appropriately spray the PUR in an intentional manner. PUR is applied at an elevated temperature relative to ambient conditions. To ensure appropriate flow characteristics of PUR through the spraying nozzle, the heater 1318 maintains the spraying nozzle at a temperature appropriate for the PUR material.

Continuing with the example of applying PUR material in the application module 114, the melter 1320 and the pump 1322 are provided. In an example, the PUR is brought to an appropriate temperature for spraying application by the melter 1320. For example, a state change from the PUR as stored may be desired such that the PUR is fluid like and flows. This state change of PUR may be achieved by an elevated temperature (e.g., a glass transition temperature, a melting temperature) relative to ambient conditions. And that elevated temperature relative to ambient is accomplished by placing PUR in the melter 1320 until the PUR achieves a necessary viscosity or flow characteristic to be applied by a spraying nozzle. To further aid in the conveyance of the PUR to and through a spraying nozzle, PUR is extracted from the melter 1320 and conveyed to the spraying nozzle 1302 by the pump 1322. The pump 1322 is effective to apply a determined amount of pressure to the PUR for adequate application of PUR from the spraying nozzle 1302. In combination, the melter 1320, the pump 1322, and the spraying nozzle 1302 are fluidly coupled (e.g., through tubing, piping, and the like) to convey the flowable PUR.

The application module 114 is structured for the application of a material to an article maintained by the cradle 802. However, the application module is also configured to limit that amount of material that is intended to be applied to the article from also being maintained on components of the system, such as the cradle 802, the rails 1214, and eventually the components themselves (e.g., the masking platform) tasked with limiting the application of material to the system. The application module 114 accomplishes this limitation on contamination through use of one or more masks, brushes, and/or scrappers.

As will be depicted in FIGS. 14-18, these protection components operate in conjunction with each other to limit the potential contamination of the system by the material being applied and therefore increasing the uptime of the system as a whole. For example, if the material being applied is an adhesive, such as PUR, the cradle and the rail could accumulate a sufficient quantity of the adhesive to prevent movement of the cradles on the rails. Remedying this accumulation may include stopping the system and performing a regular cleaning operation. It is this downtime that aspects hereof aim to limit or avoid through timed and appropriate use of the various components of the masking platform, brushes, and scrappers.

FIG. 13 shows a configuration 1300 where the cradle 802 having a first side 1324 and a second side 1326 is positioned on the rail 1214 at the application module 114. The masking platform is in a first position that is a retracted position. It is this retracted position that will be illustrated in FIG. 18 that the scrapper 1802 may be implemented to scrape the top surfaces (e.g., surfaces exposed to the spraying nozzle 1302) of the masking platform (e.g., first portion masking platform 1306 and second portion masking platform 1308) to remove over sprayed material. The removal of the over sprayed material limits contamination of the system and increases uptime of the system. The masking platform will be depicted as extending towards the cradle 802 and the rail 1214 to at least partially surround the cradle 802 in a second position, as depicted in a sequence of FIGS. 14-16.

FIG. 14 depicts the masking platform transitioning from the retracted first position of FIG. 13 toward the second position. In a configuration 1400 of FIG. 14, the first portion masking platform 1306 is on the first side of the cradle 802 and the second portion masking platform 1308 is on the second side of the cradle. In the configuration 1400, the masking platform at least partially surrounds the cradle 802. Also in the configuration 1400, the masking platform masks the rail to limit deposition of material being sprayed from the spraying nozzle 1302 from the rail. Also depicted in the configuration 1400 is the first portion secondary mask 1310 and the second portion secondary mask 1314 sliding transversely along the first portion masking platform 1306 and the second portion masking platform 1308, respectively, toward a central portion of the cradle 802.

Movement of the masking platform elements may be achieved by any actuation mechanism, such as an electric linear actuator, pneumatic actuator, hydraulic actuator, and the like. Movement of the masking platform elements may also be achieved by other mechanisms, such as electric drives, chain, pulleys, and the like. Control of the position and movement of the masking platform may be achieved by a computing device, such as the computing device 118 of FIG. 1.

Figure 15:
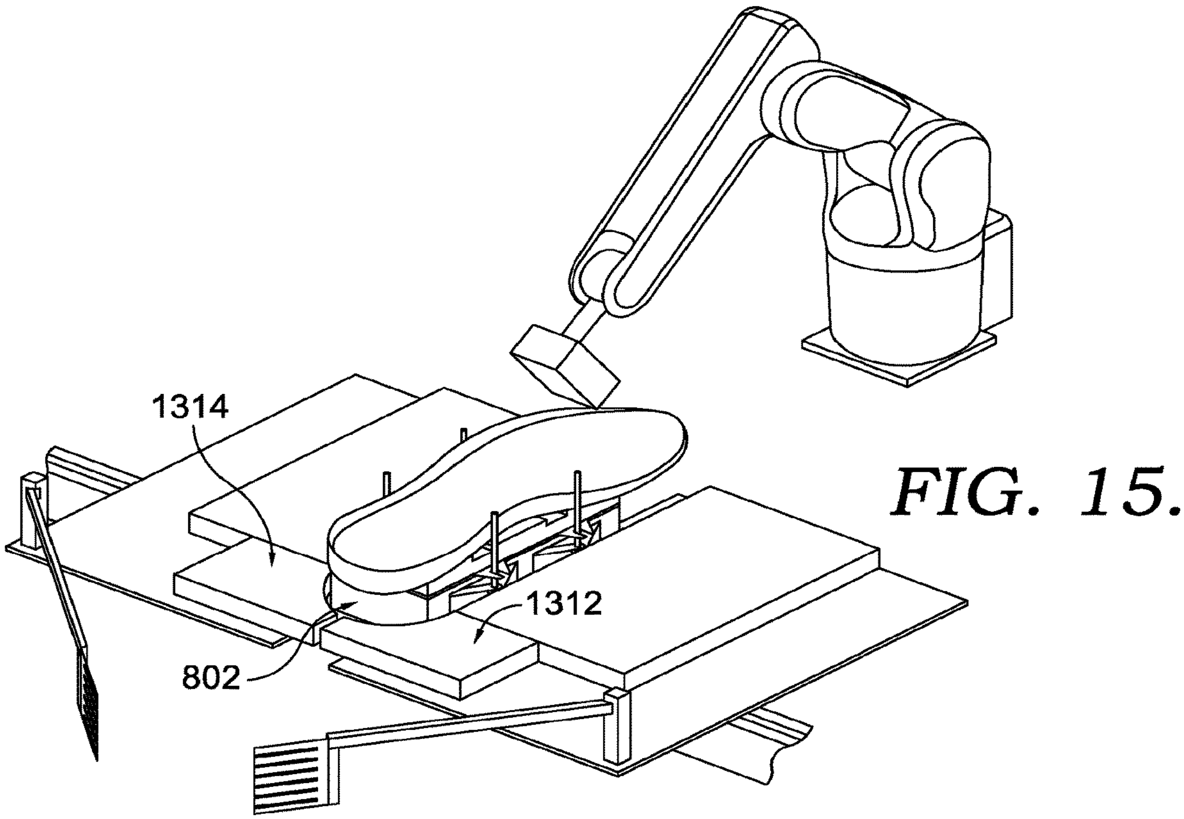
FIG. 15 depicts the application module of FIG. 13 having a masking platform in a second position, in accordance with aspects hereof.

FIG. 15 depicts a configuration 1500 of the application module such that the first portion secondary mask 1310 and the second portion secondary mask 1314 additionally surround the cradle 802, in accordance with aspects hereof In the configuration 1500, the first portion secondary mask 1310 is positioned on the first side of the cradle 802 and the second portion secondary mask 1314 is position on the second side of the cradle 802. A distal end of the first portion secondary mask 1310 extends between the first side and the second side of the cradle (e.g., to a midpoint between the first side and the second side of the cradle 802). A distal end of the second portion secondary mask 1314 extends between the second side and the first side of the cradle (e.g., a midpoint between the first side and the second side of the cradle 802). The configuration 1500 provides an example of the second position of the masking platform that is effective to limit contamination of the system 100 by the material emitted from the spraying nozzle. As can be seen between FIGS. 13, 14, and 15, a progression of the masking platform position to increase with each configuration an amount of cradle surround that is accomplished. The enhanced cradle surround provides a greater protection from contamination to the system by the applied material as more portions of the system that could become contaminated are obscured by the masking platform.

Figure 16:
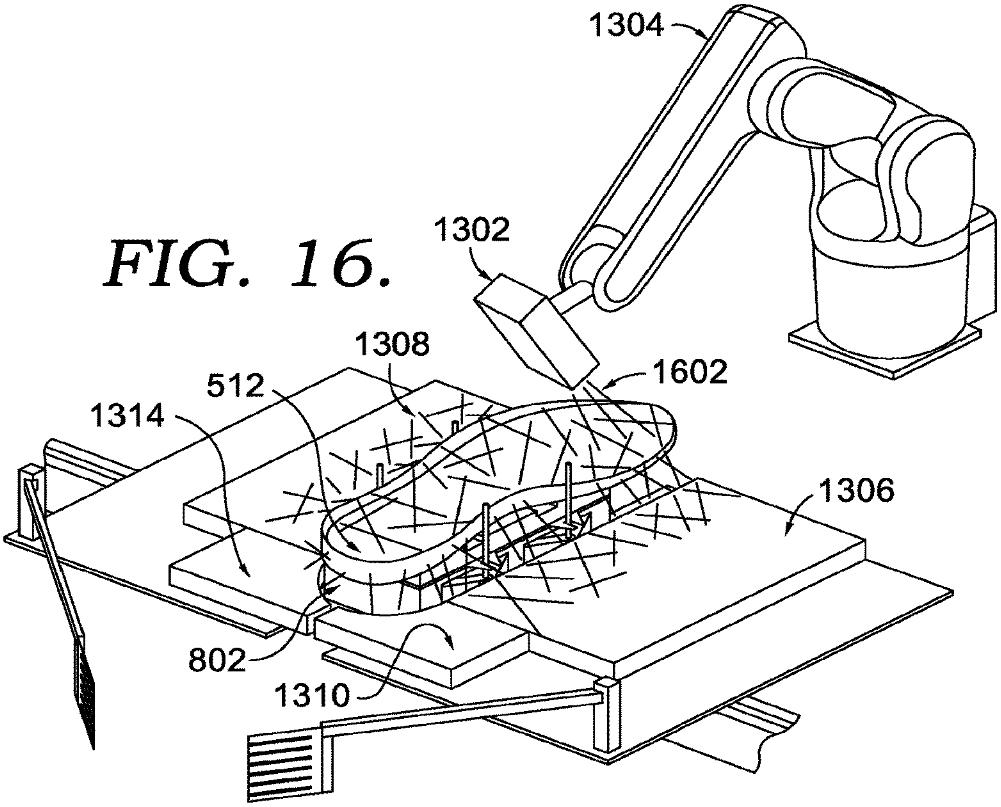
FIG. 16 depicts the application module of FIG. 13 having a spraying nozzle applying a material to a footwear component and the masking platform, in accordance with aspects hereof.

FIG. 16 depicts the spraying nozzle 1302 applying a material 1602, such as a PUR adhesive to the footwear component 512, in accordance with aspects hereof. As the multi-axis conveyance mechanism 1304 moves the spraying nozzle 1302 to apply the material 1602 across a surface of the footwear component 512, a portion of the material 1602 extends beyond the footwear component 512 and is deposited on the masking platform. In an example, this overspray is intentional to ensure the material 1602 is applied to the perimeter/extent of the article without failing to reach the distal points. As such, over spraying the article and intentionally allowing the material 1602 to overspray onto the masking platform allows for an ensured coverage of the material on the article's surface. FIG. 15 illustrates the masking effect achieved by the masking platform the protect portions of the cradle and the rail from the intentionally over sprayed material.

Figure 17:
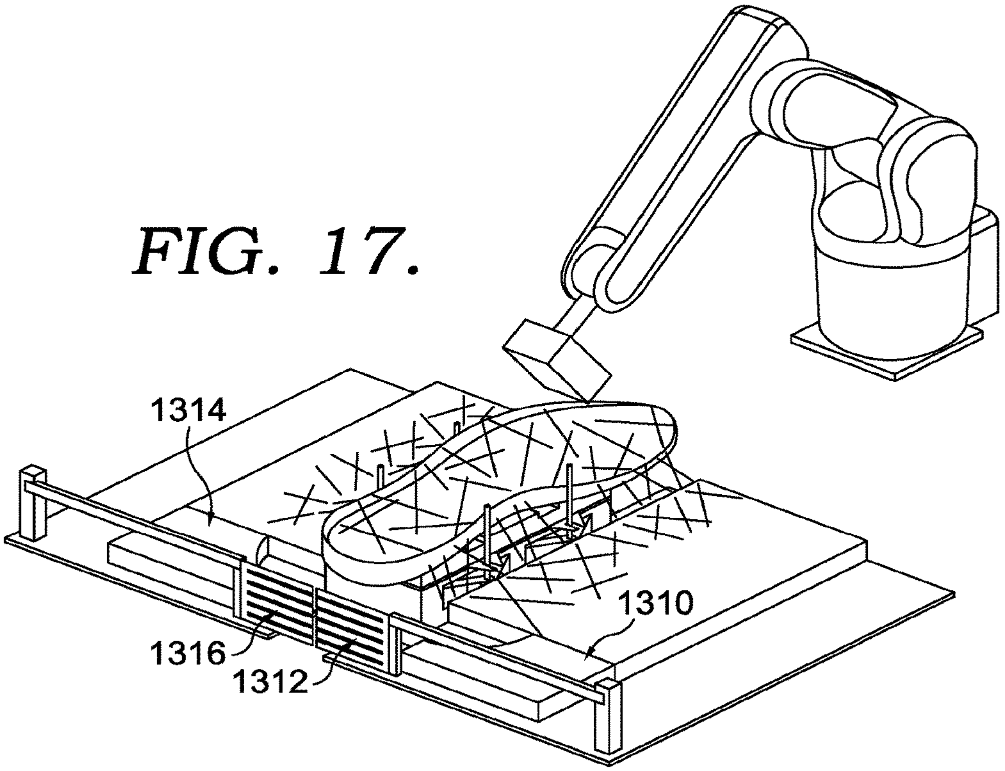
FIG. 17 depicts the application module of FIG. 13 having a second mask retracted and material brushed positioned to brush sprayed material, in accordance with aspects hereof.

Following the coverage of the article with the sprayed material, the over sprayed material is deposited on the masking platform, on a portion of the cradle, and also on unintended sides of the article (e.g., a sidewall of a shoe sole). Furthermore, the material may extend in an uninterrupted manner from the article to the masking platform. Therefore, the material may need to be terminated (e.g., interruption of continuity) at the article's perimeter to separate the article from the masking platform. FIG. 17 depicts the first material brush 1312 extending from a first side of the masking platform (e.g., a side comprised of the first portion masking platform) and the second material brush 1316 extending from a second side of the masking platform (e.g., a side comprised of the second portion masking platform). The first material brush 1312 and the second material brush 1316 are in a closed position (e.g., effective for brushing the cradle and/or article) in FIG. 17. As also depicted in FIG. 17, the first portion secondary mask 1310 and the second portion secondary mask 1314 are in a retracted position in preparation for the masking platform to return to the retracted first position from the second position.

Figure 18:
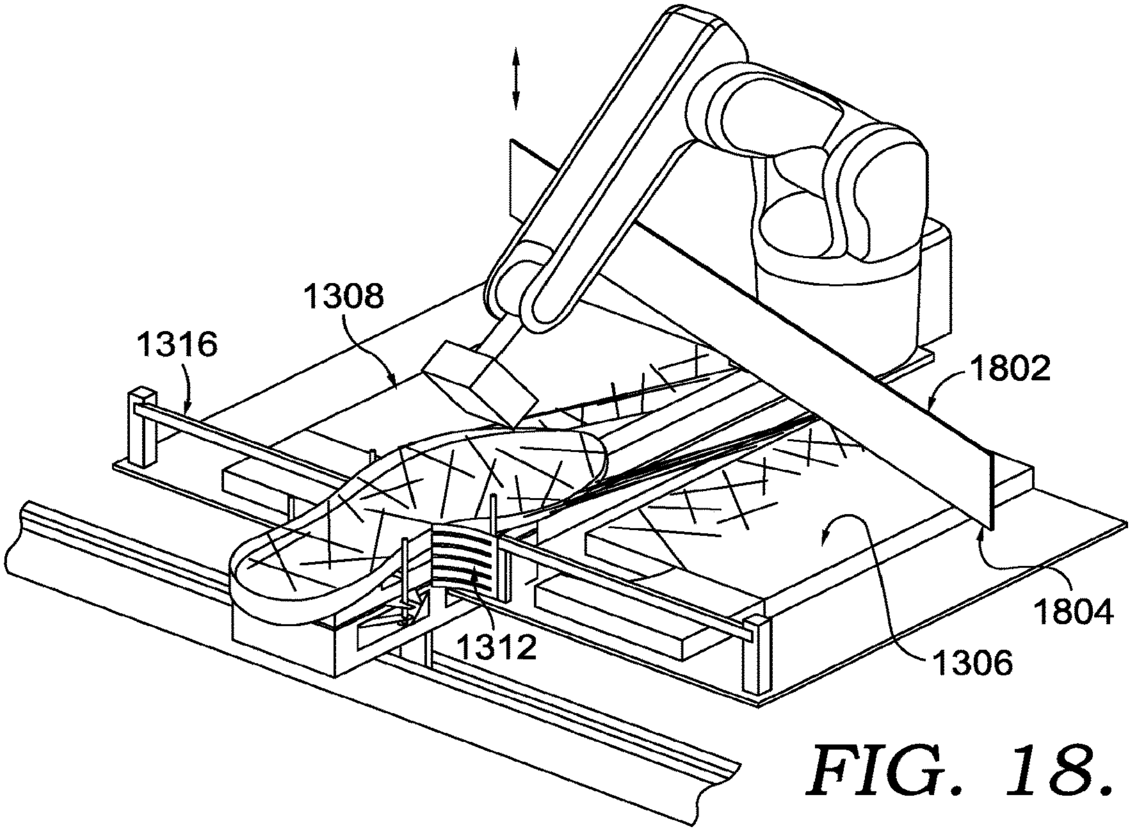
FIG. 18 depicts the application module of FIG. 13 having the masking platform returning to the first position and the material brushes contacting the article of footwear component, in accordance with aspects hereof.

As depicted in FIG. 18, the masking platform is returning to the retracted first position, in accordance with aspects hereof. As the masking platform retracts, the first material brush 1312 and the second material brush 1316 remain in a closed position and brush along surfaces of the article that are not intended to have material applied, such as a sidewall extending from an edge of the surface intended to be sprayed with the material. The material brushes are also effective to dislodge or otherwise remove over sprayed material from the cradle first side and the cradle second side as the masking platform retracts from the masking position. The material brushes may be formed from any material, such as an elastomeric material like silicone or a thermoplastic polyurethane. In an example, each material brush is attached to an arm that is moveably mounted with the masking platform such that as the platform moves (e.g., from the second position to the first position), the material brushes also move as a result. The moveable mounting allows the material brushes to be positioned, such as through a pivoting motion between the arms and masking platform, to contact a desired surface/component as the masking platform repositions.

Also depicted in FIG. 18 is the positioning of the scrapper 1802 having a scrapping surface 1804, in accordance with aspects hereof. As over sprayed material accumulates on a surface of the masking platform, removal of the accumulation may be accomplished by scrapping the surface of the masking platform with the scrapper 1802. It is contemplated that once the masking platform returns to the retracted first position, the scrapper is lowered to contact the masking platform so that as the masking platform extends in a future application cycle from the first position toward the second position, the lowered scrapper scraps along the surface of the masking platform because of the movement of the masking platform. The scrapping by the scraping platform may be performed between each application process (e.g., scrapped each cycle). Alternatively, it is contemplated that the scrapper 1802 is positioned to scrape the masking platform at various interval (e.g., every 2 cycles, every 3 cycles, every 4 cycles, and/or every 5 cycles). In yet another example, it is contemplated that the scrapper 1802 is positioned in response to a detection, such as through a vision system, of sufficient material build up to warrant the scrape to occur. It is contemplated that the position of the scrapper 1802 may be adjusted by an actuation mechanism as provided herein. Additionally, it is contemplated that a computing device, such as the computing device 118 of FIG. 1 is effective to control the position and use of the scrapper 1802, in an exemplary aspect.

Figure 19:
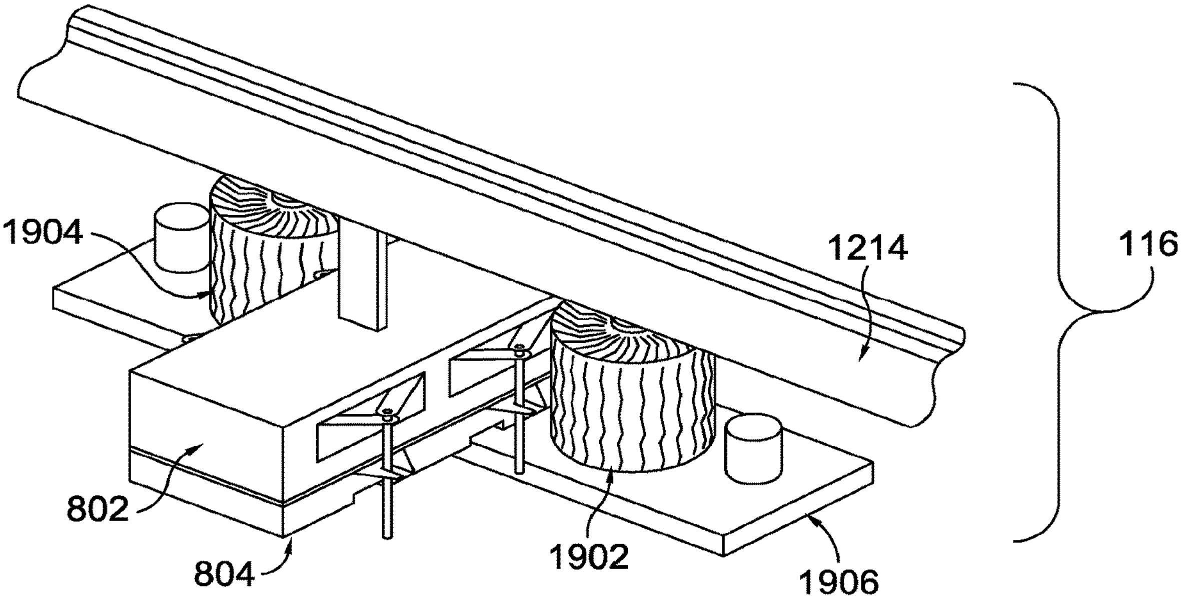
FIG. 19 depicts a cradle cleaning module that may be used in connection with the system of FIG. 1, in accordance with aspects hereof.

While the masking platform through a masking function and a brushing function limits the overspray accumulation of material on the cradle, it is contemplated that some accumulation may still occur. For example, portions of the multi-part linkage and side walls of the cradle may accumulate material in some examples. As such, the cradle cleaning module 116 of FIG. 1 may be implemented. FIG. 19 depicts the cradle cleaning module 116 that may be used in connection with the system of FIG. 1, in accordance with aspects hereof.

It is contemplated that the cradles travel in a loop on the rail 1214. In the depicted example of FIG. 19, the cradles return from the application module to the cradle loading module on a bottom side of the rail 1214. During this return trip, FIG. 19 depicts the cradle 802 being cleaned by a first brush 1902 and a second brush 1904 as conveyed by a brush mount 1906. As previously discussed, it is contemplated that the cradles may remain stationary for a period of time while the application module applies material. During a stationary phase of a return trip on the rail 1214, the brush mount 1906 is extended from an inactive position to an active position, such as by an actuating mechanism contemplated herein. As the brush mount 1906 moves from the inactive position to the active position, the first brush 1902 and the second brush 1904 rotate (e.g., spin) and contact the first side and the second side of the cradle. The brushes may be rotated by a rotation generator, such as an electric motor, a pneumatic motor, a hydraulic motor, and the like. The direction and velocity of the rotation may be adjusted based on the cradle, the condition of the cradle, and/or the position at which the brushes are relative to the cradle. For example, a different characteristic may be implemented when the brushes are contacting a portion of the multi-part linkage versus contacting a sidewall of the cradle not having the multi-part linkage.

Following the cleaning of the cradle at the cradle cleaning module 116, it is contemplated the cradle 802 is used again on the conveyance loop of the rail 1214. It is this looped relationship that reinforces the advantage of masking the cradle and cleaning the cradle for continuous and efficient use of the system as a whole.

Figure 20:
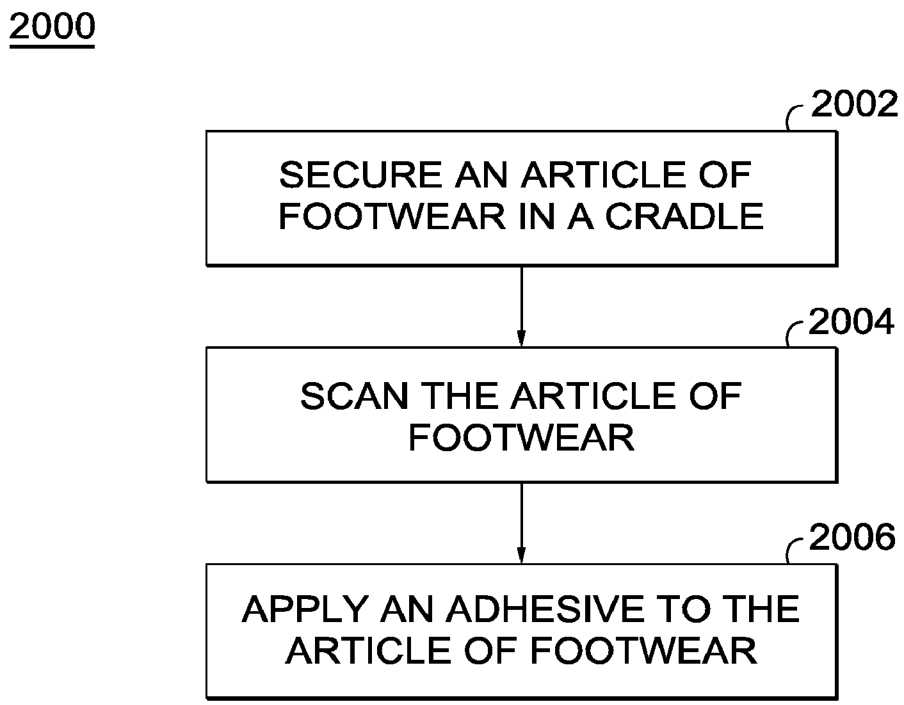
FIG. 20 depicts a flow chart representing a method of spraying a footwear component, in accordance with aspects hereof.

FIG. 20 depicts a flow chart 2000 representing a method of spraying a footwear component, in accordance with aspects hereof. At a block 2002 an article, such as a footwear component, is secured in a cradle. The securement of the article may be performed after aligning the article in the transverse direction of the material flow direction. Additionally, it is contemplated that the article is secured in the cradle by transitioning a multi-part linkage from an active position that is maintained open despite a biased influence from the cradle itself. For example, the system may apply a force to the multi-part linkage to overcome a tensioning force that biases the multi-part linkage away from the activate position. Once the article is positioned between one or more sets of fingers associated with one or more multi-part linkages, the biasing force of each multi-part linkage is allowed to position each multi-part linkage towards a resting position that is effective to apply a compressive force on the article via the one or more fingers extending from the multi-part linkages. It is this compressive force in connection with a supporting surface of the cradle that effectively secures the article for future operations.

At a block 2004, the article, such as an article of footwear component, is scanned. The scanning provide three-dimensional data of the article, or a surface of the article, for effective application of a material to the article or surface of the article in a subsequent process. The scanning may be accomplished through one or more image capture devices, such as a camera. The scanning may also be accomplished use a structured light source, such as a laser, that projects a structured light (e.g., a line) on the surface to be scanned. The structured light passes over the surface as the one or more image capture devices captures images of the structured light on the surface. Using stereoscopic effects created from taking images from multiple perspectives at a common time, a three-dimensional mapping of the surface is formed by a computing device.

In the situation of a shoe sole, the surface being scanned may be a foot-facing surface that is intended to be joined with an upper assembly (e.g., the portion of a shoe intended to enclose the foot and secure the foot to the sole). The foot-facing surface of the sole may include a cup-like sole structure that extends upwardly away from a ground-facing surface of the sole. This cup-like structure allows the sole to surround the sides of the foot of a wearer as the foot-facing surface extends upwardly. This surround cradles the foot and provides additional support and resistance to medial and lateral movement. It is this cup-like structure that a three-dimensional mapping helps to determine for generating or selecting an appropriate tool path that ensure application of material on the surface, even when the surface is non-planar. Therefore, the three dimensional scan by a vision system allows an appropriate tool path to be used in connection with a spraying nozzle to effectively position the spraying nozzle on the complex surface of a foot-facing surface of a sole, in this example.

At a block 2006, an adhesive is applied to the article of footwear. As provided above, the article is secured in a cradle and then scanned to determine a surface mapping of the article to which the adhesive will be applied. The application of the adhesive is accomplished by a multi-axis conveyance mechanism that is effective to convey and position a spraying nozzle relative to the surface on to which the adhesive will be sprayed.

Application of a PUR adhesive may be accomplished using a variety of components discussed herein. For example, a pail or other melting vessel may convert PUR from a first state to a second state that is appropriate for spray application. The PUR may then be precisely dispensed by a precision controller having a pump associated therewith. The precision controller is effective to control an amount and pressure of PUR that is dispensed to ensure appropriate coverage of the surface with the PUR. The PUR may then be conveyed to a spraying nozzle extending from a multi-axis robotic arm. In some example the nozzle includes a heating element, such as a heater, to ensure the spraying nozzle emits the PUR at an appropriate temperature for effective use as a spray-applied adhesive to the article. The connection between the various components, such as a pail, a melter, a controller, and spraying nozzle, is contemplated as a thermally regulated series of lines/hoses/tubes. For example, the connections may be heated hoses that maintains the PUR at or above a prescribed temperature until dispensed on the article.

During the application of adhesive to the article, the system implements a number of safeguards to limit contamination of the system by the applied adhesive. For example, a masking platform at least partially surround the cradle to mask the mechanism conveying the cradle and to partially mask the cradle itself. The masking platform may continue to modify the environment by extension of secondary masks that surround a portion of the cradle associated with a heel end or toe end of the article. This two-art movement allows the masking platform to increase an amount of surround and enclosure of the system affected by the adhesive application. Efforts to minimize contamination on the masking platform and the cradle may be accomplished through the use of material brushes and scrapers that convert motion of the masking platform into a brushing and/or scraping activity. Further, a cradle cleaning module may also be leveraged to further ensure the cradle and associated multi-part linkages are cleaned between process on different articles.

In some aspects, it is contemplated that the footwear component, such as a sole, may have a temporary mask associated therewith during one or more portions of the spraying the footwear component. The mask is contemplated as being a removable mask that is associated with, such as being secured therewith, the footwear component prior to entering a system provided herein (e.g., system 100 of FIG. 1). In this example, the mask may travel with the footwear component through two or more stations (e.g., loading station, alignment station, cradle loading station, vision station, and/or application station). For example, the mask may be associated with the footwear component prior to the footwear component entering the system. Having the mask associated with the footwear component through multiple stations of the system allows for the mask to be considered in the various stations to ensure appropriate positioning, placement, identification, and or application of material to the footwear component. For example, having the mask associated with the footwear component during at least the visions station and the application station aids in ensuring the mask is accounted for when instructing the application of material to the footwear component.

In an alternative example, the mask may be associated with the footwear component exclusively for a single station of the system, such as the application station. In that example, the mask may be applied in transit to the station or at the station. The mask may be removed in transit from the station or at the station. The mask may be used in a single station to limit interference with the system stations in which the mask is not relied on or intended for.

Figure 21:
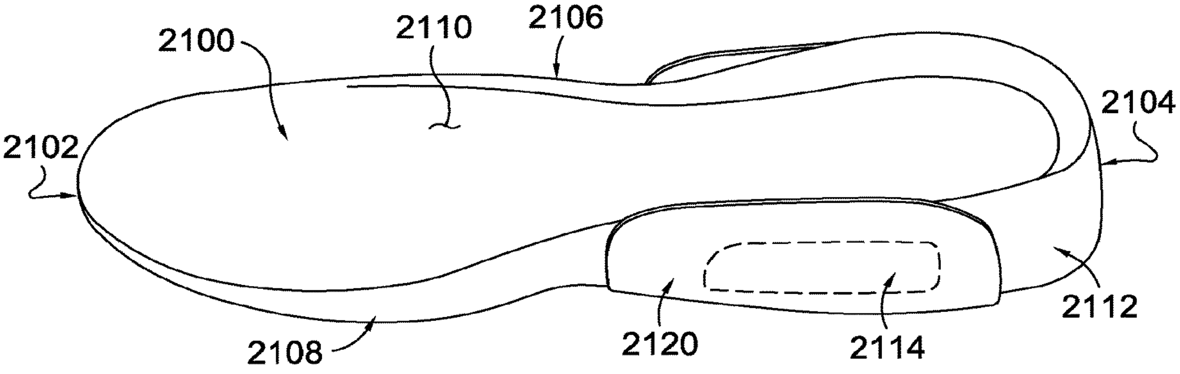
FIG. 21 depicts an example mask on an article of footwear component, in accordance with aspects hereof.
Figure 22:
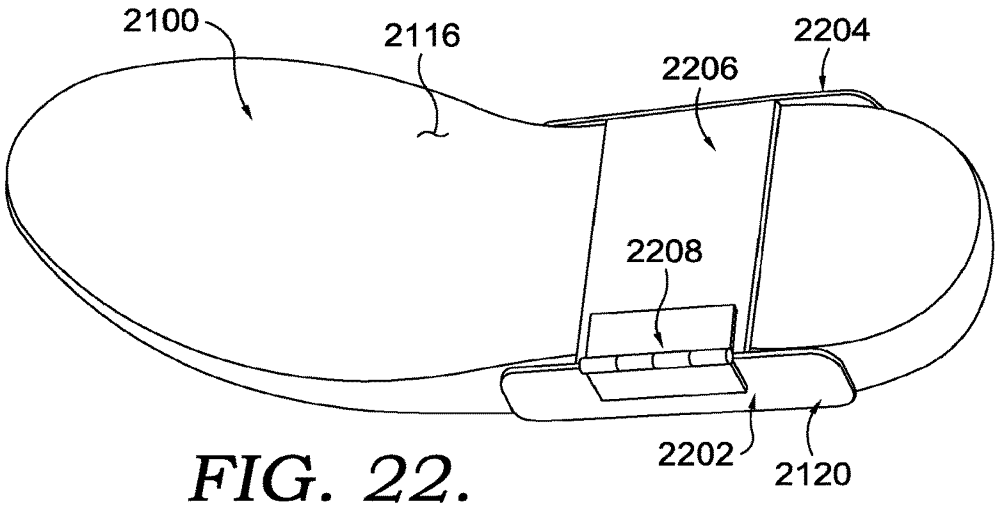
FIG. 22 depicts the article of footwear component and mask of FIG. 21 from a ground-facing perspective, in accordance with aspects hereof.

FIG. 21 depicts an example mask 2120 on an article of footwear component 2100, in accordance with aspects hereof. The article of footwear component 2100 is a sole in this example. The article of footwear component 2100 has a toe end 2102, a heel end 2104, a lateral side 2106, a medial side 2108, a foot-facing surface 2110, and a ground-facing surface 2116 (as best seen in FIG. 22). The article of footwear component 2100 also has a sidewall 2112 that extends between a superior edge (which may or may not intersect with the foot-facing surface 2110) and an inferior edge (which may or may not intersect with the ground-facing surface 2116).

The sidewall 2112 may form at least a portion of an external surface of the finished article of footwear. Therefore, the sidewall 2112 may be visible in a final product to an observer of the final product. As such, in some examples, material applied in the application station that is deposited on the sidewall 2112, or any portion of the article of footwear component 2100 that is not intended to receive the material application, may cause the article of footwear component from being used in a final product. For example, the application of material to a sidewall that is visible in the final product may discolor, damage, or otherwise create an unacceptable (e.g., aesthetically unpleasing) element to the article of footwear component 2100. As such, a mask may be implemented in some examples to protect portions of the footwear component 2100 from application of the material (e.g., overspray of the material).

In a specific example, the article of footwear component may include a secondary element 2114, such as an airbag or other impact-attenuating element, that forms at least a portion of an exterior surface of the article of footwear component 2100 and that is comprised of a different material or surface finish than other portions of the article of footwear component 2100. In some examples, the material being applied during an application process is an adhesive that has a greater affinity for bonding to the secondary element than the other portions of the article of footwear component. For example, the secondary element may be formed from a composition to which a PUR adhesive chemically adheres to such as level that the PUR overspray cannot be easily removed with mechanical means (e.g., brushing). Therefore, it is desired, in these examples, to mechanically mask the secondary element from potential PUR overspray to prevent a rejection of the article of footwear component as a whole because of the oversprayed secondary element.

Additionally, it is contemplated that a mask may prevent overspray on other portions of the article of footwear component, such as a painted portion. In an example, a portion of the article of footwear component is painted (or any surface treatment) prior to being sprayed with a material. In some instances, the material to be sprayed on the article of footwear component (e.g., PUR) may chemically bond with the paint in a manner that makes mechanical removal difficult or results in a loss in the paint quality. In this example, the mask may protect the painted portion of the article of footwear component from overspray.

An example of a mask 2120 is depicted in FIG. 21. The mask 2120 obscures a portion of the article of footwear component 2100 from externally applied material, such as a PUR adhesive. The portion protected by the mask 2120 is the sidewall 2112 and the secondary element 2114. Additional portions of the article of footwear component 2100 protected by a mask (e.g., foot-facing surface 2110 and ground-facing surface 2116) are contemplated.

A mask may be formed from any material, such as a metallic-based material (e.g., aluminum, steel) and/or a polymer-based material (e.g., polypropylene, polyester, polyethylene, polyimide, polyurethane, polyvinylchloride, silicone, and thermoplastic elastomers). The mask may have any size and shape effective to mask an intended portion of the article of footwear component. Further, the mask may rely on any mechanism for securing to the article of footwear component.

Figure 23:
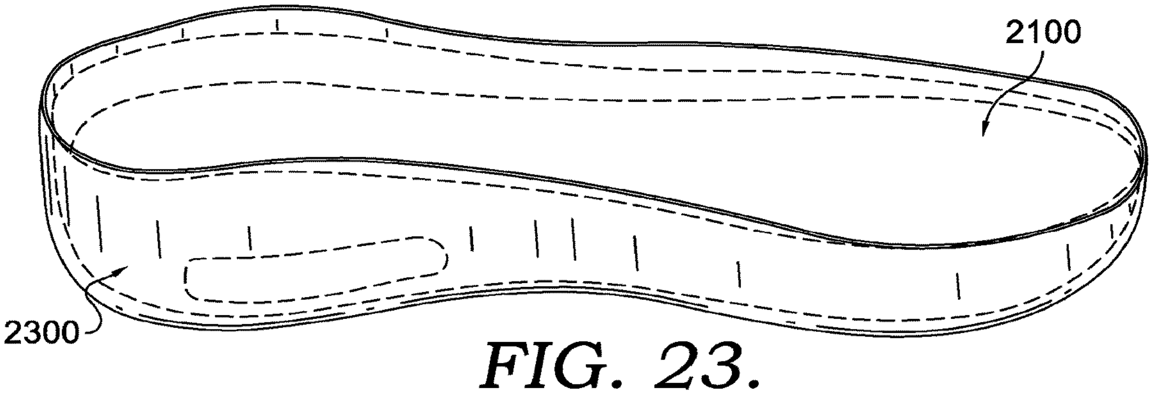
FIG. 23 depicts an alternative mask example, in accordance with aspects hereof.

In an exemplary aspect, a mask is secured with an article of footwear component through a mechanical engagement, such as compression. The compression may be accomplished through a mechanically biased element (e.g., spring or elastomeric element). The compression may be achieved through the compressibility of the article of footwear component itself being placed in a mask that is less forgiving and provides a compressive fit to the article of footwear component, which is depicted in FIG. 23 hereinafter. It is also contemplated that a temporary adhesive may aid in securing the mask to the article of footwear component. For example, an adhesive may be applied to the article of footwear component and/or a portion of the mask to secure the mask and the article of footwear component together.

FIG. 22 depicts the article of footwear component 2100 and mask 2120 of FIG. 21 from a ground-facing perspective, in accordance with aspects hereof. The mask 2120 include a first wing 2202, a second wing 2204, and a bridge 2206. The first wing 2202 is effective to obscure the sidewall 2112 of FIG. 21 on the lateral side and the second wing 2204 is effective to obscure the sidewall 2112 of FIG. 21 on the medial side. However, reference to the first wing and the second wing is not limited to the lateral and medial sides respectively. Instead the features of the first wing or the second wing may be applicable to any portion (e.g., any side) of the article of footwear component. The first wing 2202 extends from the bridge 2206. As depicted, a pivoting connecting is formed between the bridge 2206 and the first wing 2202 by a hinge 2208. The hinge 2208 allows the first wing 2202 to rotate between an open configuration for receiving the article of footwear component 2100 and a closed configuration for masking the sidewall of the article of footwear component 2100. The hinge 2208 may be biased to the closed configuration, such as through an internal spring, to impart a compressive force on the article of footwear component 2100 between the second wing 2204. An ability to transition the first wing 2202 (or any wing) between an open and a closed position allows for ease of applying and removing the mask from the article of footwear component.

The second wing 2204 is depicted as rigidly extending from the bridge 2206. However, as discussed above, it is contemplated that the second wing 2204 may be pivotally joined with the bridge 2206 in an alternative example. In this alternative example, the second wing 2204 is configured to transfer between an open and a closed configuration, as provided above.

As depicted, the second wing 2204 provides a static surface against which the article of footwear component 2100 may be compressed to aid in the securement of the mask 2120 to the article of footwear component 2100. The size and shape of the wings, such as the second wing 2204, may be adjusted to achieve an appropriate masking of the associated article without interfering with a process to be performed on the article of footwear component. As such, the wing may extend from the bridge any height. Similarly, a wing may extend at any location and for any length along the bridge. Each element of the mask 2120, such as the wings and the bridges, may have any form, such as a curvature that corresponds with one or more surfaces to be masked. Further, it is contemplated that the bridge is capable of extending across any portion of the article of footwear component such that any portion of the article of footwear component may be masked.

As provided in FIGS. 21 and 22, the first wing 2202 and the second wing 2204 are configured to mask at least the secondary element 2114 of the article of footwear component 2100. In this specific example, the secondary element 2114 may be an air bag containing positive pressure gas. The surface of the air bag is formed from a material to which a PUR adhesive chemically adheres and is difficult to remove in an aesthetically pleasing manner. As such, in connection with the other elements of system 100 of FIG. 1, the mask 2120 is effective to allow for the application of the PUR adhesive on the foot-facing surface 2110 of the article of footwear component 2100 while limiting or preventing an overspray of the PUR adhesive on at least the secondary elements 2114. The various masking platforms contemplated herein remain effective and are enhanced, in an example, through the use of the mask 2120. Further, cleaning of contaminants from the article of footwear component as provided herein are also effective for removing contaminants from the mask 2120, in an example.

FIG. 23 depicts an alternative mask, a mask 2300, in accordance with aspects hereof. The mask 2300 is a cup-like mask into which the article of footwear component 2100 is inserted. The mask 2300, in this example, is a static shape into which a component to be masked is inserted. It is contemplated that the mask 2300 may be formed from any material, such as a polymer based material. The mask 2300 may be rigid or it may be flexible (e.g., silicone). When the mask 2300 is rigid, the mask 2300 may rely on the component inserted therein to conform to the size and shape of the mask 2300. When the mask 2300 is formed from a flexible material (e.g., elastomeric), the mask 2300 may, in part, conform to the component inserted therein.

The mask 2300 may be disposable or reusable. The mask 2300 may be formed from a material that is easier to remove contaminants (e.g., PUR overspray) as compared to at least a portion of the component inserted therein. This relative ease in cleaning allows for efficiency in production process as tolerances on spraying applications may be reduced allowing for faster spraying and a greater resulting throughput.

It is contemplated that any mask may be used in connection with the spraying of an article of footwear component. The masks of FIGS. 21-23 are examples and are not limiting.

The following is a listing of component and parts referenced in connection with the various FIGs. Discussed herein.

Listing of parts:

| | |
|---|---|
| 100 - System | 118 - Computing Device |
| 102 - Material Flow Direction | 200 - Progress Blocker |
| 104 - Conveyance | 202 - Actuator |
| 106 - Loading Station | 204 - Blocker Body |
| 108 - Alignment Station | 206 - Blocker Body Surface |
| 110 - Cradle Loading Station | 208 - Footwear Component |
| 112 - Vision System | 210 - Footwear Component |
| 114 - Application Station | 212 - Second Conveyor |
| 116 - Cradle Cleaning Station | 502 - Transverse Actuator |
| 504 - Transverse Body | 1116 - Tension Spring |
| 506 - Position Actuator | 118 - First Angle |
| 508 - Position Body | 1120 - First Distance |
| 510 - Conveyance Belt | 1122 - Second Angle |
| 512 - Footwear Component | 1124 - Second Distance |
| 514 - Conveyance Belt Drive | 1202 - Laser |
| 602 - Conveyance Belt Gap | 1204 - Image Capture Device |
| 702 - Movement Mechanism | 1206 - Image Capture Device |
| 704 - First Tine | 1208 - Laser Light Pattern |
| 706 - Second Tine | 1210 - Laser Light Line |
| 802 - Cradle | 1212 - Surface |
| 804 - Cradle Support Surface | 1214 - Rail |
| 806 - First Finger | 1216 - Field of View |
| 808 - Second Finger | 1218 - Field of View |
| 810 - Third Finger | 1302 - Spraying Nozzle |
| 812 - Fourth Finger | 1304 - Multi-axis Conveyance Mechanism |
| 1102 - Multi-part Linkage | 1306 - First Portion Masking Platform |
| 1104 - First Link | 1308 - Second Portion Masking Platform |
| 1106 - Second Link | 1310 - First Portion Secondary Mask |
| 1108 - Pivot Joint | 1312 - First Material Brush |
| 1110 - Third Link | 1314 - Second Portion Secondary Mask |
| 1112 - Fourth Link | 1316 - Second Material Brush |
| 1114 - Pivot Joint | 1318 - Heater |
| 1320 - Melter | 2106 - Lateral side |
| 1322 - Pump | 2108 - Medial side |
| 1324 - First Side | 2110 - Foot-facing surface |
| 1326 - Second Side | 2112 - Sidewall |
| 1602 - Adhesive | 2114 - Secondary element |
| 1802 - Scrapper | 2116 - Ground-facing surface |
| 1804 - Scrapper Surface | 2120 - Mask |
| 1904 - First brush | 2202 - First wing |
| 1904 - Second Brush | 2204 - Second wing |
| 1906 - Brush Mount | 2206 - Bridge |
| 2100 - Article of footwear component | 2208 - Hinge |
| 2102 - Toe end | 2300 - Mask |
| 2104 - Heel end | |

From the foregoing, it will be seen that this invention is one well-adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

The following clauses are aspects contemplated herein.

Clause 1. A system capable of spraying an article of footwear component, the system comprising:

- a cradle having a support surface, a first finger, and a second finger capable to compress the article of footwear component between the first finger and the second finger;
- a vision system having a field of view directed to the cradle support surface, wherein the vision system is comprised of a laser and an image capture device; and
- an application station, the application station comprising:
  - a spraying nozzle;
  - a multi-axis conveyance mechanism, wherein the spraying nozzle extends from the multi-axis conveyance mechanism; and
  - a masking platform, the masking platform is moveable between a first position and a second position, wherein the masking platform at least partially surrounds the cradle when the masking platform is in the second position and is retracted from the cradle in the first position.

Clause 2. The system of clause 1, wherein the first finger and the second finger are joined by a linkage having a first link pivotally coupled with a second link and the first finger extends from the first link and the second finger extends from the second link.

Clause 3. The system of clauses 1-2, wherein the first finger and the second finger extend from a multi-part linkage having a resting position with the first finger and second finger separated by a first distance and the multi-part linkage having an activated position with the first finger and the second finger separated by a second distance that is greater than the first distance.

Clause 4. The system of clause 3, wherein the multi-part linkage is a quad linkage having a tension spring biasing the multi-part linkage to the resting position.

Clause 5. The system of any of clauses 1-4, wherein the laser of the vision system is moveably mounted.

Clause 6. The system of any of clauses 1-5, wherein the vision system is further comprised of a second image capture device.

Clause 7. The system of clause 6, wherein the image capture device and the second image capture device are on opposite sides of the laser.

Clause 8. The system of any of clauses 1-7, wherein the application station further comprises a melter and a pump, wherein the melter comprises a heating element capable of raising a temperature of a polyurethane to a melt temperature and the pump capable of dispensing the polyurethane to the spraying nozzle.

Clause 9. The system of clause 8, wherein the spraying nozzle includes a heating element.

Clause 10. The system of any of clauses 1-9, wherein the multi-axis conveyance mechanism is a multi-axis robotic arm.

Clause 11. The system of any of clauses 1-10, wherein the masking platform further comprises a secondary mask, wherein the masking platform is positioned on a first side of the cradle and on a second side of the cradle and the secondary mask is positioned, at least in part, between the first side of the cradle and the second side of the cradle as the masking platform is in the second position.

Clause 12. The system of any of clauses 1-11, wherein the masking platform at least partially surrounds the cradle a greater amount in the second position than in the first position.

Clause 13. The system of any of clauses 1-12, wherein in the second position, the secondary mask extends between the first side and the second side of the cradle.

Clause 14. The system of any of clauses 1-13, wherein the application station further comprises a masking platform scrape, the masking platform scrape has a first position that is not in contact with the masking platform and a second position that is in contact with the masking platform.

Clause 15. The system of clause 14, wherein the masking platform scrape is in the second position as the masking platform transitions between the first position and the second position.

Clause 16. The system of any of clauses 1-15, wherein the masking platform further comprises a first material brush and a second material brush, wherein the first material brush extends from a first side of the masking platform and the second material brush extends from a second side of the masking platform.

Clause 17. The system of any of clauses 1-16 further comprising a computing device logically coupled with the vision system and the application station.

Clause 18. The system of any of clauses 1-17 further comprising a cradle cleaning station, the cradle cleaning station comprised of at least one brush.

Clause 19. The system of any of clauses 1-18 further comprising a movement mechanism having at least a first tine and a second tine, the movement mechanism positioned in a material flow direction of the system prior to the cradle.

Clause 20. The system of any of clauses 1-19 further comprising a progress blocker, the progress blocker coupled with an actuator having at least a first position and a second position, wherein the progress blocker is positioned upstream in a material flow direction from the cradle.

Clause 21. A method of spraying an article of footwear component, the method comprising: securing an article of footwear component between a first finger and a second finger on opposite sides of a cradle; scanning the article of footwear component with a vision system having a field of view directed to the cradle, wherein the vision system is comprised of a laser and an image capture device; and applying an adhesive to the article of footwear component at an application station, the application station comprising: a spraying nozzle from which the adhesive is applied to the article of footwear component; a multi-axis conveyance mechanism, wherein the spraying nozzle extends from and is moved by the multi-axis conveyance mechanism; and a masking platform, the masking platform moves between a first position and a second position to mask a portion of the cradle from the adhesive applied from the spraying nozzle.

Clause 22. The method of clause 21 further comprising releasing the article of footwear component on a conveyor prior to securing the article of footwear component, wherein a progress blocker moves from a first position blocking the article of footwear component to a second position releasing the article of footwear component.

Clause 23. The method of any of clauses 21-22 further comprising adjusting a position of the article of footwear component in a traverse direction of a conveyor prior to securing the article of footwear component.

Clause 24. The method of any of clauses 21-23 further comprising elevating the article of footwear component from a conveyor to the cradle with a movement mechanism having at least a first tine and a second tine.

Clause 25. The method of any of clauses 21-24 further comprising compressing a linkage supporting the first finger and the second finger, wherein the compressing the linkage transitions the first finger and the second finger from a resting position with the first finger and second finger separated by a first distance to an activated position with the first finger and the second finger separated by a second distance that is greater than the first distance.

Clause 26. The method of any of clauses 21-25, wherein the scanning of the article of footwear component is comprised of changing a location a projected laser light emitted from the laser contact the article of footwear component.

Clause 27. The method of any of clauses 21-26, wherein scanning is comprised of moving the laser such that a light emitted from the laser moves across at least a portion of the article of footwear component.

Clause 28. The method of any of clauses 21-27 further comprising determining a three-dimensional surface of the article of footwear component from data acquired during the scanning of the article of footwear component.

Clause 29. The method of any of clauses 21-28, wherein the adhesive is a polyurethane.

Clause 30. The method of any of clauses 21-29, wherein applying the adhesive further comprises heating the adhesive to a first temperature.

Clause 31. The method of clause 30, wherein the first temperature is at or above a melting temperature of the adhesive.

Clause 32. The method of clause 31, wherein the adhesive is pumped from a melter by a pump to the spraying nozzle after being heated to the first temperature.

Clause 33. The method of clause 32, wherein the spraying nozzle is heated to a second temperature.

Clause 34. The method of any of clauses 21-33, wherein the applying of the adhesive comprises moving the spraying nozzle by the multi-axis machine along a tool path determined, at least in part, from the scanning of the article of footwear component.

Clause 35. The method of any of clauses 21-34, wherein the applying of the adhesive applies adhesive to the article of footwear component and the masking platform.

Clause 36. The method of any of clauses 21-35, wherein the masking platform in the second position moves a secondary mask to partially enclose the article of footwear component between a first side and a second side of the masking platform.

Clause 37. The method of clause 36, wherein when the masking platform transitions from the second position to the first position, a first material brush and a second material brush adjust from an inactive position to an active position, wherein the first material brush extends from a first side of the masking platform and the second material brush extends from a second side of the masking platform.

Clause 38. The method of any of clauses 21-37 further comprising positioning a masking platform scrape from a first position that is not in contact with the masking platform to a second position that is in contact with the masking platform.

Clause 39. The method of clause 38 further comprising moving the masking platform from the second position to the first position while the masking platform scrape is in the second position.

Clause 40. The method of any of clauses 21-39 further comprising conveying the cradle through a cradle cleaning station comprised of a first brush.

Clause 41. A system capable of spraying an article of footwear component, the system comprising: a cradle having a support surface, a first finger, and a second finger; a vision system having a field of view directed to the cradle support surface; and an application station, the application station comprising: a spraying nozzle; and a masking platform, the masking platform moveable between a first position and a second position, wherein the masking platform at least partially surrounds the cradle when the masking platform is in the second position and is retracted from the cradle in the first position.

Clause 42. A system capable of spraying an article of footwear component, the system comprising: a cradle; and an application station, the application station comprising: a spraying nozzle; and a masking platform, the masking platform moveable between a first position and a second position, wherein the masking platform at least partially surrounds the cradle when the masking platform is in the second position and is retracted from the cradle in the first position.

The invention claimed is:

1. A method of spraying an article of footwear component, the method comprising:

securing an article of footwear component on a cradle support surface of a cradle between a first finger and a second finger on opposite sides of the cradle support surface;

scanning the article of footwear component with a vision system having a field of view directed to the cradle, wherein the vision system is comprised of a laser and an image capture device; and applying an adhesive to the article of footwear component at an application station, the application station comprising: a spraying nozzle from which the adhesive is applied to the article of footwear component; a multi-axis conveyance mechanism, wherein the spraying nozzle extends from and is moved by the multi-axis conveyance mechanism; and a masking platform, the masking platform moves between a first position and a second position to mask a portion of the cradle from the adhesive applied from the spraying nozzle.

2. The method of claim 1 further comprising releasing the article of footwear component on a conveyor prior to securing the article of footwear component, wherein a progress blocker moves from a first position blocking the article of footwear component to a second position releasing the article of footwear component.

3. The method of claim 1 further comprising adjusting a position of the article of footwear component in a traverse direction of a conveyor prior to securing the article of footwear component.

4. The method of claim 1 further comprising elevating the article of footwear component from a conveyor to the cradle with a movement mechanism having at least a first tine and a second tine.

5. The method of claim 1 further comprising compressing a linkage supporting the first finger and the second finger, wherein the compressing of the linkage transitions the first finger and the second finger from a resting position with the first finger and the second finger are separated by a first distance to an activated position with the first finger and the second finger separated by a second distance that is greater than the first distance.

6. The method of claim 1, wherein the scanning of the article of footwear component is comprised of changing a location a projected laser light emitted from the laser contacts the article of footwear component.

7. The method of claim 1, wherein scanning is comprised of moving the laser such that a light emitted from the laser moves across at least a portion of the article of footwear component.

8. The method of claim 1 further comprising determining a three-dimensional surface of the article of footwear component from data acquired during the scanning of the article of footwear component.

9. The method of claim 1, wherein the adhesive is a polyurethane.

10. The method of claim 1, wherein applying the adhesive further comprises heating the adhesive to a first temperature.

11. The method of claim 10, wherein the first temperature is at or above a melting temperature of the adhesive.

12. The method of claim 11, wherein the adhesive is pumped from a melter by a pump to the spraying nozzle after being heated to the first temperature.

13. The method of claim 12, wherein the spraying nozzle is heated to a second temperature.

14. The method of claim 11, wherein the applying of the adhesive comprises moving the spraying nozzle by the multi-axis conveyance mechanism along a tool path determined, at least in part, from the scanning of the article of footwear component.

15. The method of claim 1, wherein the applying of the adhesive applies the adhesive to the article of footwear component and the masking platform.

16. The method of claim 1, wherein the masking platform in the second position moves a secondary mask to partially enclose the article of footwear component between a first side and a second side of the masking platform.

17. The method of claim 16, wherein when the masking platform transitions from the second position to the first position, a first material brush and a second material brush adjust from an inactive position to an active position, wherein the first material brush extends from a first side of the masking platform and the second material brush extends from a second side of the masking platform.

18. The method of claim 17 further comprising positioning a masking platform scrape from a first position that is not in contact with the masking platform to a second position that is in contact with the masking platform.

* * * * *